United States Patent
Lai et al.

(10) Patent No.: US 12,445,301 B2
(45) Date of Patent: Oct. 14, 2025

(54) IDENTITY AUTHENTICATION METHOD AND APPARATUS

(71) Applicant: CHINA IWNCOMM CO., LTD., Shaanxi (CN)

(72) Inventors: Xiaolong Lai, Shaanxi (CN); Jun Cao, Shaanxi (CN); Manxia Tie, Shaanxi (CN); Qin Li, Shaanxi (CN); Xiaorong Zhao, Shaanxi (CN); Bianling Zhang, Shaanxi (CN); Zhenhai Huang, Shaanxi (CN)

(73) Assignee: CHINA IWNCOMM CO., LTD., Shaanxi (CN)

( * ) Notice: Subject to any disclaimer, the term of this patent is extended or adjusted under 35 U.S.C. 154(b) by 281 days.

(21) Appl. No.: 18/269,653

(22) PCT Filed: Dec. 21, 2021

(86) PCT No.: PCT/CN2021/140040
§ 371 (c)(1),
(2) Date: Jun. 26, 2023

(87) PCT Pub. No.: WO2022/135387
PCT Pub. Date: Jun. 30, 2022

(65) Prior Publication Data
US 2024/0323028 A1    Sep. 26, 2024

(30) Foreign Application Priority Data

Dec. 26, 2020   (CN) .......................... 202011569232.0

(51) Int. Cl.
*H04L 9/32* (2006.01)
*H04L 9/40* (2022.01)

(52) U.S. Cl.
CPC ........ *H04L 9/3247* (2013.01); *H04L 63/0823* (2013.01); *H04L 63/10* (2013.01)

(58) Field of Classification Search
None
See application file for complete search history.

(56) References Cited

U.S. PATENT DOCUMENTS 10,447,658 B2 * 10/2019  Shah .................... H04L 63/0823

FOREIGN PATENT DOCUMENTS

| CN | 1602107 A | 3/2005 |
|----|-----------|--------|
| CN | 101631113 A | 1/2010 |

(Continued)

OTHER PUBLICATIONS

Lin, Fan, "Research of Security Access Technology for Long-Range Wireless Networks," Mobile Communications, Dec. 2014, pp. 31-35.

*Primary Examiner* — Benjamin E Lanier
(74) *Attorney, Agent, or Firm* — ArentFox Schiff LLP; Michael Fainberg

(57) ABSTRACT

Disclosed are an identity authentication method and apparatus. When identity information is transmitted between a request device and an authentication access controller, confidentiality processing is performed on the identity information of the request device and the authentication access controller, so as to prevent the identity information of the request device and the authentication access controller from being exposed during a transmission process, thereby ensuring that an attacker cannot obtain private and sensitive information of the request device and the authentication access controller.

20 Claims, 8 Drawing Sheets

(56) References Cited

FOREIGN PATENT DOCUMENTS

| | | | | |
|---|---|---|---|---|
| CN | 111355745 A | 6/2020 | | |
| EP | 3299984 A1 | 3/2018 | | |
| KR | 20130103752 A | * 9/2013 | ............. | H04L 63/08 |
| WO | WO-2011020279 A1 | * 2/2011 | ......... | H04L 63/0823 |

* cited by examiner

IDENTITY AUTHENTICATION METHOD AND APPARATUS

CROSS-REFERENCE TO RELATED APPLICATIONS

The present application is a US National Stage of International Application No. PCT/CN2021/140040, filed on Dec. 21, 2021, which claims priority to Chinese Patent Application No. 202011569232.0, filed with the China National Intellectual Property Administration on Dec. 26, 2020 and entitled "Identity Authentication Method and Apparatus", which is hereby incorporated by reference in its entirety.

FIELD

The present application relates to the field of network communication security technology, and particularly to an identity authentication method and apparatus.

BACKGROUND

In a communication network, a request device can access the network through an authentication access controller. In some cases that require relatively high security, the authentication access controller needs to authenticate an identity of the request device, and the request device also needs to authenticate an identity of the authentication access controller, to ensure that the request device accessing the network belongs to a legal user and the network that the request device accesses belongs to a legal network. Moreover, node-to-node transmission in the blockchain technology also needs to establish a trust relationship between different nodes, so it is also very important to authenticate the identity of the node.

In the process of mutual identity authentication between the request device and the authentication access controller, both the request device and the authentication access controller need to provide their own identity information for identity authentication. However, such identity information generally carries private and sensitive information such as ID number, home address, bank card information, geographic location information or organizational information; and in practical applications, such identity information is generally included in a digital certificate, and the digital certificate is used as the identity certificate of the entity.

If the identity information of the request device or the authentication access controller is intercepted by an attacker for illegal purposes in the process of mutual identity authentication between the request device and the authentication access controller, great security risks will be brought to the authentication access controller, the request device and the network.

SUMMARY

In order to solve the above technical problem, the present application provides an identity authentication method and apparatus. By involving an authentication server, the mutual identity authentication between the authentication access controller and the request device is realized while ensuring the confidentiality of the information related to the entity identity.

In a first aspect, an embodiment of the present application provides an identity authentication method, including:

obtaining, by an authentication access controller, an identity ciphertext message sent by a request device, where the identity ciphertext message includes an identity information ciphertext of the request device, and the identity information ciphertext is generated by encrypting to-be-encrypted data including a digital certificate of the request device using a message encryption key;

decrypting, by the authentication access controller, the identity information ciphertext of the request device using the message encryption key, to obtain the digital certificate of the request device;

sending, by the authentication access controller, a first authentication request message to a first authentication server trusted by the authentication access controller, where the first authentication request message includes the digital certificate of the request device and a digital certificate of the authentication access controller;

receiving, by the authentication access controller, a first authentication response message sent by the first authentication server, where the first authentication response message includes first authentication result information, a first digital signature, second authentication result information and a second digital signature, the first authentication result information includes a first verification result of the digital certificate of the authentication access controller, the first digital signature is a digital signature generated by a second authentication server trusted by the request device through calculating to-be-signed data including the first authentication result information, the second authentication result information includes a second verification result of the digital certificate of the request device, and the second digital signature is a digital signature generated by the first authentication server through calculating to-be-signed data including the second authentication result information;

verifying, by the authentication access controller, the second digital signature using a public key of the first authentication server; determining, by the authentication access controller, an identity authentication result of the request device according to the second verification result in the second authentication result information when the verification passes; and sending, by the authentication access controller, a third authentication response message to the request device when determining that the identity authentication result of the request device is legal; or verifying, by the authentication access controller, the second digital signature using the public key of the first authentication server; and sending, by the authentication access controller, the third authentication response message to the request device and determining the identity authentication result of the request device according to the second verification result in the second authentication result information when the verification passes; or verifying, by the authentication access controller, the second digital signature using the public key of the first authentication server; determining, by the authentication access controller, the identity authentication result of the request device according to the second verification result in the second authentication result information when the verification of the second digital signature passes; and sending, by the authentication access controller, the third authentication response message to the request device;

where the third authentication response message includes an identity authentication result information ciphertext, the identity authentication result information ciphertext is generated by encrypting to-be-encrypted data including the first authentication result information and the first digital signature using the message encryption key;

decrypting, by the request device, the identity authentication result information ciphertext using the message encryption key to obtain the first authentication result information and the first digital signature after receiving the third authentication response message; verifying, by the request device, the first digital signature using a public key of the second authentication server; and determining, by the request device, an identity authentication result of the authentication access controller according to the first verification result in the first authentication result information when the verification passes.

In a second aspect, an embodiment of the present application provides an authentication access controller, including:

an obtaining unit configured to obtain an identity ciphertext message sent by a request device, where the identity ciphertext message includes an identity information ciphertext of the request device, and the identity information ciphertext is generated by encrypting to-be-encrypted data including a digital certificate of the request device using a message encryption key;

a decryption unit configured to decrypt the identity information ciphertext of the request device using the message encryption key, to obtain the digital certificate of the request device;

a sending unit configured to send a first authentication request message to a first authentication server trusted by the authentication access controller, where the first authentication request message includes the digital certificate of the request device and a digital certificate of the authentication access controller;

a receiving unit configured to receive a first authentication response message sent by the first authentication server, where the first authentication response message includes first authentication result information, a first digital signature, second authentication result information and a second digital signature, the first authentication result information includes a first verification result of the digital certificate of the authentication access controller, the first digital signature is a digital signature generated by a second authentication server trusted by the request device through calculating to-be-signed data including the first authentication result information, the second authentication result information includes a second verification result of the digital certificate of the request device, and the second digital signature is a digital signature generated by the first authentication server through calculating to-be-signed data including the second authentication result information;

a verification unit configured to verify the second digital signature using a public key of the first authentication server, where a determining unit determines an identity authentication result of the request device according to the second verification result in the second authentication result information when the verification passes; and the sending unit sends a third authentication response message to the request device when the determining unit determines that the identity authentication result of the request device is legal; or verify the second digital signature using the public key of the first authentication server, where the sending unit sends the third authentication response message to the request device and the determining unit determines the identity authentication result of the request device according to the second verification result in the second authentication result information when the verification passes; or verify the second digital signature using the public key of the first authentication server; where the determining unit determines the identity authentication result of the request device according to the second verification result in the second authentication result information when the verification of the second digital signature passes; and the sending unit sends the third authentication response message to the request device;

where the third authentication response message includes an identity authentication result information ciphertext, the identity authentication result information ciphertext is generated by encrypting to-be-encrypted data including the first authentication result information and the first digital signature using the message encryption key.

In a third aspect, an embodiment of the present application provides a request device, including:

a sending unit configured to send an identity ciphertext message to an authentication access controller, where the identity ciphertext message includes an identity information ciphertext of the request device, and the identity information ciphertext is generated by encrypting to-be-encrypted data including a digital certificate of the request device using a message encryption key;

a receiving unit configured to receive a third authentication response message sent by the authentication access controller, where the third authentication response message includes an identity authentication result information ciphertext, the identity authentication result information ciphertext is generated by encrypting to-be-encrypted data including first authentication result information and a first digital signature using the message encryption key; the first authentication result information includes a first verification result of a digital certificate of the authentication access controller, and the first digital signature is a digital signature generated by a second authentication server trusted by the request device through calculating to-be-signed data including the first authentication result information;

a decryption unit configured to decrypt the identity authentication result information ciphertext using the message encryption key, to obtain the first authentication result information and the first digital signature;

a verification unit configured to verify the first digital signature using a public key of the second authentication server;

a determining unit configured to determine an identity authentication result of the authentication access controller according to the first verification result in the first authentication result information when the verification of the first digital signature passes.

In a fourth aspect, an embodiment of the present application provides an authentication access controller, including:

a memory configured to store program instructions;
a processor configured to invoke the program instructions stored in the memory and perform the method on the authentication access controller side in the above-mentioned first aspect in accordance with an obtained program.

In a fifth aspect, an embodiment of the present application provides a request device, including:

a memory configured to store program instructions;
a processor configured to invoke the program instructions stored in the memory and perform the method on the request device side in the above-mentioned first aspect in accordance with an obtained program.

In a sixth aspect, an embodiment of the present application provides a computer storage medium storing the computer executable instructions, where the computer executable instructions are configured to cause a computer to perform the method described in the first aspect above.

As can be seen from the above technical solutions, when identity information is transmitted in the identity authentication process between the request device and the authentication access controller, the identity information of the request device and the authentication access controller is kept secret, which can prevent the identity information from being exposed in the network access process, and ensure that the attacker cannot obtain private and sensitive information; and the involving of the authentication server realizes the real-time mutual identity authentication between the authentication access controller and the request device while ensuring the confidentiality of the entity identity-related information, to lay the foundation for ensuring that only legal users can access legal networks.

BRIEF DESCRIPTION OF THE DRAWINGS

In order to illustrate embodiments of the present application or technical solutions in the related art more clearly, the accompanying drawings which need to be used in describing embodiments or the related art will be introduced below briefly. Obviously the accompanying drawings described below are some embodiments of the present application, and other accompanying drawings can also be obtained by those ordinary skilled in the art according to these accompanying drawings without creative labor.

DETAILED DESCRIPTION OF EMBODIMENTS

Figure 1:
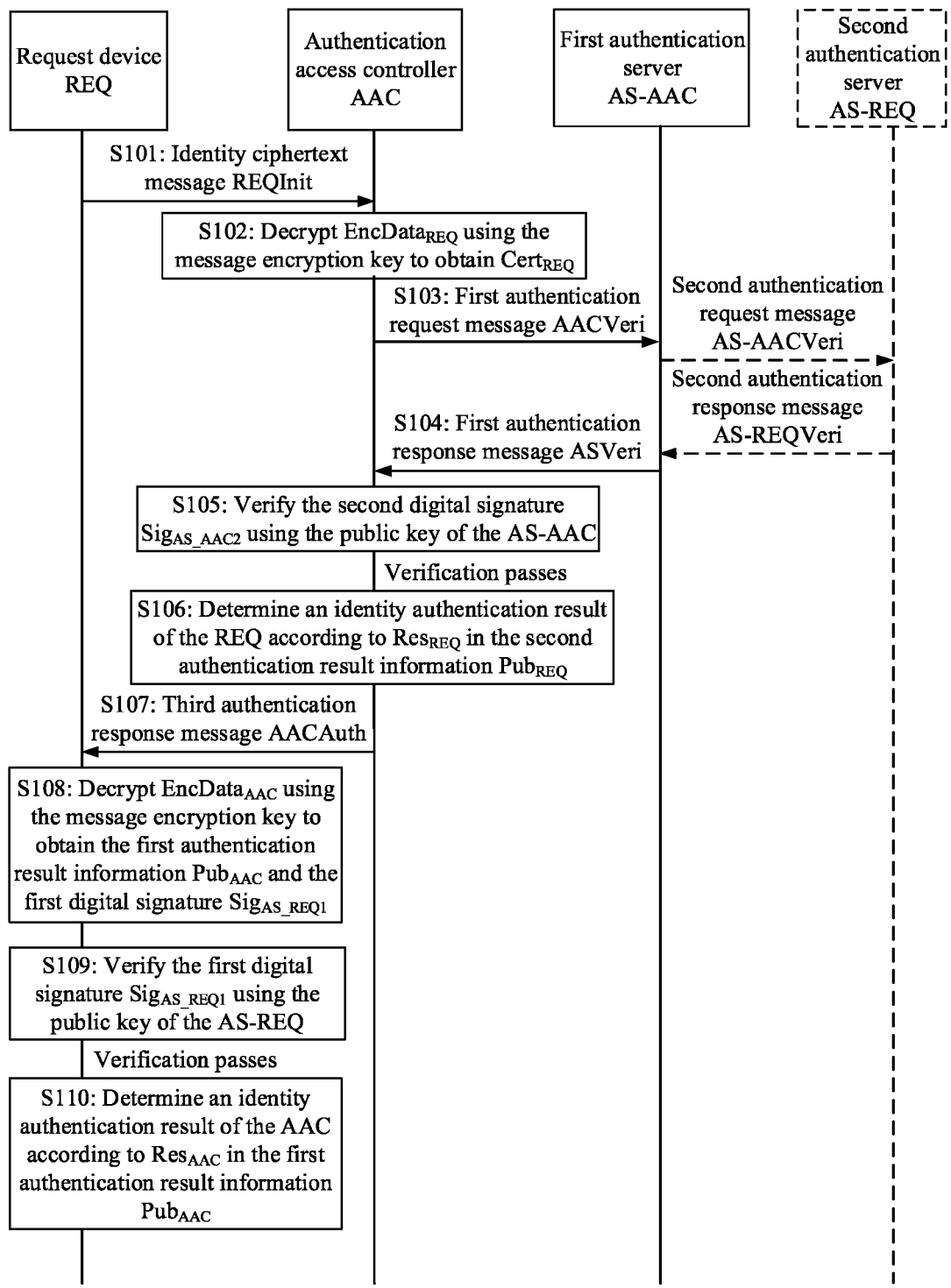
FIG. 1 is a schematic diagram of an identity authentication method according to an embodiment of the present application.

In a communication network, a request device can access the network through an authentication access controller. In order to ensure that the request device accessing the network belongs to a legal user, the authentication access controller needs to authenticate the identity of the request device; and in order to ensure that the network accessed by the request device belongs to a legal network, the request device also needs to authenticate the identity of the authentication access controller.

Taking the current wireless communication and mobile communication scenarios as an example, in the scenario where the request device accesses the wireless network through the authentication access controller, the request device may be a terminal device such as a mobile phone, a Personal Digital Assistant (PDA for short) or a tablet computer, and the authentication access controller may be a network side device such as a wireless access point or a wireless router. In the scenario where the request device accesses the 4th/5th Generation mobile communication technology (4G/5G for short) network through the authentication access controller, the request device may be a terminal device such as a mobile phone or a tablet computer, and the authentication access controller may be a network side device such as a base station. Of course, the present application is also applicable to various data communication scenarios such as other wired networks and short-distance communication networks.

However, in the process of mutual identity authentication between the request device and the authentication access controller, both the request device and the authentication access controller need to provide their own identity information. The identity information is generally included in a digital certificate. If the attacker intercepts the digital certificate, the attacker can obtain private and sensitive information in the digital certificate and use the private and sensitive information for illegal purposes, resulting in great security risks to the authentication access controller, the request device and even the network.

In order to solve the above technical problem, an embodiment of the present application provides an identity authentication method, including: an authentication access controller obtains an identity ciphertext message sent by a request device, where the identity ciphertext message includes an identity information ciphertext of the request device, and the identity information ciphertext is generated by encrypting to-be-encrypted data including a digital certificate of the request device using a message encryption key; and the identity ciphertext message can ensure the security of transmission of the identity information of the request device between the request device and the authentication access controller. Then, the authentication access controller decrypts the identity information ciphertext of the request device using the message encryption key to obtain the digital certificate of the request device, sends a first authentication request message including the digital certificate of the request device and a digital certificate of the authentication access controller to a first authentication server trusted by the authentication access controller, and receives a first authentication response message sent by the first authentication server, where the first authentication response message includes first authentication result information, a first digital signature, second authentication result information and a second digital signature, the first authentication result information includes a first verification result of the digital certificate of the authentication access controller, the first digital signature is a digital signature generated by a second authentication server trusted by the request device through calculating to-be-signed data including the first authentication result information, the second authentication result information includes a second verification result of the digital certificate of the request device, and the second digital signature is a digital signature generated by the first authentication server through calculating to-be-signed data including the second authentication result information; and the authentication access controller verifies the second digital signature using a public key of the first authentication server, and determines an identity authentication result of the request device according to the second verification result in the second authentication result information when the verification passes. When determining that the request device is legal, the authentication access controller sends a third authentication response message including an identity authentication result information ciphertext to the request device, where the identity authentication result information ciphertext is generated by encrypting to-be-encrypted data including the first authentication result information and the first digital signature using the message encryption key; and the request device decrypts the identity authentication result information ciphertext using the message encryption key to obtain the first authentication result information and the first digital signature, verifies the first digital signature using a public key of the second authentication server, and determines an identity authentication result of the authentication access controller according to the first verification result in the first authentication result information when the verification passes.

It can be understood that the first authentication result information mentioned in an embodiment of the present application is obtained by the first authentication server trusted by the authentication access controller through verifying legality of the digital certificate of the authentication access controller, and the second authentication result information is obtained by the second authentication server trusted by the request device through verifying legality of the digital certificate of the request device. The above-mentioned first authentication server and second authentication server may be two independent servers for identity authentication, or a same server for identity authentication. The above content is only some examples of the request device, authentication access controller and authentication server, and should not be understood as limitations on the request device, authentication access controller and authentication server. In other possible implementations of embodiments of the present application, the request device, authentication access controller and authentication server may also be other devices.

The identity authentication method provided by an embodiment of the present application is to realize the Mutual Identity Authentication (MIA for short) between the authentication access controller and the request device.

For ease of introduction, in embodiments of the present application, the identity authentication method of the present application will be introduced by taking the request device (REQuester, REQ), Authentication Access Controller (AAC) and Authentication Server (AS) as an example.

Here, the AS trusted by the AAC is called the first authentication server AS-AAC, and the AS trusted by the REQ is called the second authentication server AS-REQ. The AS-AAC has the ability to verify the legality of the digital certificate of the AAC, and the AS-AAC holds a digital certificate that conforms to ISO/IEC 9594-8/ITU X.509, other standards or other technical system regulations, and a private key corresponding to the digital certificate. The AS-REQ has the ability to verify the legality of the digital certificate of the REQ, and the AS-REQ holds a digital certificate that conforms to ISO/IEC 9594-8/ITU X.509, other standards or other technical system regulations, and a private key corresponding to the digital certificate. The AS-AAC and AS-REQ have the ability to transfer the digital certificate to other ASs for verification, and also have the ability to transfer the verification result information of the digital certificate to other ASs. When the AS-AAC and AS-REQ are different, the AS-AAC and AS-REQ trust each other and know each other's digital certificate or the public key in the digital certificate.

The REQ may be an endpoint participating in the identity authentication process, establishes a connection with the AAC, accesses services provided by the AAC, and accesses the AS through the AAC; and the REQ holds a digital certificate that conforms to ISO/IEC 9594-8/ITU X.509, other standards or other technical system regulations and a private key corresponding to the digital certificate, and knows the digital certificate of the AS-REQ or the public key in the digital certificate of the AS-REQ. The AAC may be another endpoint participating in the identity authentication process, establishes a connection with the REQ, provides services and communicates with the REQ, and may directly access the AS-AAC; and the AAC holds a digital certificate that conforms to ISO/IEC 9594-8/ITU X.509, other standards or other technical system regulations and a private key corresponding to the digital certificate, and knows the digital certificate of the AS-AAC or the public key in the digital certificate of the AS-AAC.

An identity authentication method according to an embodiment of the present application is illustrated in combination with FIG. 1. This method includes following steps.

S101: An AAC obtains an identity ciphertext message REQInit sent by an REQ.

The REQInit includes the identity information ciphertext $EncData_{REQ}$ of the REQ. The $EncData_{REQ}$ is generated by the REQ through encrypting the to-be-encrypted data including the digital certificate $Cert_{REQ}$ of the REQ using a message encryption key and a symmetric encryption algorithm. Therefore, in the process of transmitting the identity information between the REQ and the AAC, the identity information of the REQ is kept secret, so as to prevent the identity information of the REQ from being exposed in the transmission process.

The message encryption key may be obtained through negotiation between the REQ and the AAC, or pre-shared by the REQ and the AAC. The implementation in which the REQ and AAC negotiate the message encryption key will be introduced later. In the present application, the object to be encrypted is called to-be-encrypted data.

S102: The AAC decrypts the $EncData_{REQ}$ using the message encryption key to obtain the $Cert_{REQ}$.

Since the $EncData_{REQ}$ is obtained by the REQ through encrypting the to-be-encrypted data including the $Cert_{REQ}$ using the message encryption key and the symmetric encryption algorithm, the AAC can decrypt the $EncData_{REQ}$ using the message encryption key and the symmetric encryption algorithm to obtain the $Cert_{REQ}$ after receiving the $EncData_{REQ}$.

S103: The AAC sends a first authentication request message AACVeri to an AS-AAC trusted by the AAC.

The AACVeri includes the $Cert_{REQ}$ and a digital certificate $Cert_{AAC}$ of the AAC. The AAC sends the $Cert_{AAC}$ and $Cert_{REQ}$ to the AS-AAC through the AACVeri, so as to complete the verification of the legality of the $Cert_{AAC}$ and $Cert_{REQ}$ through the AS-AAC.

It should be noted that, if the AS-REQ and AS-AAC are the same authentication server, that is, the REQ and AAC both trust the same authentication server, the authentication server trusted by both the REQ and AAC can be represented by AS-AAC (of course, can also be represented by AS-REQ) at this time. In this case, the AS-AAC (which can also represented as AS-REQ) may perform the legality verification on the $Cert_{AAC}$ to obtain a first verification result $Res_{AAC}$, perform the legality verification on the $Cert_{REQ}$ to obtain a second verification result $Res_{REQ}$, generate the first authentication result information $Pub_{AAC}$ according to the information including the $Res_{AAC}$, generate the second authentication result information $Pub_{REQ}$ according to the information including the $Res_{REQ}$, then calculate the to-be-signed data including the $Pub_{AAC}$ to generate a first digital signature $Sig_{AS\_AAC1}$ (which can also be represented as $Sig_{AS\_REQ1}$), calculate the to-be-signed data including the $Pub_{REQ}$ to generate a second digital signature $Sig_{AS\_AAC2}$ (which can also be represented as $Sig_{AS\_REQ2}$), and generate a first authentication response message ASVeri according to the information including the $Pub_{AAC}$, $Sig_{AS\_AAC1}$ (which can also represented as $Sig_{AS\_REQ1}$), $Pub_{REQ}$ and $Sig_{AS\_AAC2}$ (which can also represented as $Sig_{AS\_REQ2}$).

If the AS-REQ and AS-AAC are two different authentication servers, that is, the REQ and AAC trust different authentication servers, the AS-AAC performs the legality verification on the $Cert_{AAC}$ to obtain the first verification result $Res_{AAC}$ after receiving the first authentication request message AACVeri, generates the first authentication result information $Pub_{AAC}$ according to the information including the $Res_{AAC}$, and sends a second authentication request message AS-AACVeri to the AS-REQ, where the AS-AACVeri includes the $Pub_{AAC}$, $Cert_{REQ}$ and a third digital signature $Sig_{AS\_AAC3}$, $Sig_{AS\_AAC3}$ is a digital signature generated by the AS-AAC through calculating the to-be-signed data including the $Pub_{AAC}$ and $Cert_{REQ}$. The AS-REQ uses the public key of the AS-AAC to verify the $Sig_{AS\_AAC3}$. After the verification passes, the AS-REQ calculates the to-be-signed data including the $Pub_{AAC}$ to generate the first digital signature $Sig_{AS\_REQ1}$, performs the legality verification on the $Cert_{REQ}$ to obtain the second verification result $Res_{REQ}$, generate the second authentication result information $Pub_{REQ}$ according to the information including the $Res_{REQ}$, and calculate the to-be-signed data including the $Pub_{REQ}$ to generate a fourth digital signature $Sig_{AS\_REQ4}$. Then, the AS-REQ sends a second authentication response message AS-REQVeri to the AS-AAC, where the AS-REQVeri includes the $Pub_{AAC}$, $Sig_{AS\_REQ1}$, $Pub_{REQ}$ and $Sig_{AS\_REQ4}$. The AS-AAC uses the public key of the AS-REQ to verify the $Sig_{AS\_REQ4}$. After the verification passes, the AS-AAC calculates the to-be-signed data including the $Pub_{REQ}$ to generate the second digital signature $Sig_{AS\_AAC2}$, and generates the first authentication response message ASVeri according to the information including the $Pub_{AAC}$, $Sig_{AS\_REQ1}$, $Pub_{REQ}$ and $Sig_{AS\_AAC2}$.

S104: The AAC receives the first authentication response message ASVeri sent by the AS-AAC.

The ASVeri includes the first authentication result information $Pub_{AAC}$, the first digital signature $Sig_{AS\_REQ1}$, the second authentication result information $Pub_{REQ}$ and the second digital signature $Sig_{AS\_AAC2}$.

S105: The AAC verifies the second digital signature $Sig_{AS\_AAC2}$ using the public key of the AS-AAC.

S106: The AAC determines an identity authentication result of the REQ according to the second verification result $Res_{REQ}$ in the second authentication result information $Pub_{REQ}$.

Since the $Res_{REQ}$ can reflect whether the REQ is legal, the AAC can determine whether the REQ is legal according to the $Res_{REQ}$ in the $Pub_{REQ}$, thus laying the foundation for ensuring that only the legal REQ can access the network.

S107: The AAC sends a third authentication response message AACAuth to the REQ.

The AACAuth includes an identity authentication result information ciphertext $EncData_{AAC}$, where the $EncData_{AAC}$ is generated by the AAC through encrypting the to-be-encrypted data including the first authentication result information $Pub_{AAC}$ and the first digital signature $Sig_{AS\_REQ1}$ using the message encryption key and the symmetric encryption algorithm.

It should be noted that the execution order of S105 to S107 does not affect the specific implementation of the present application. In practical applications, the execution order of S105 to S107 can be set according to requirements. A suggestion is to execute S105 firstly. When the verification of the $Sig_{AS\_AAC2}$ by the AAC does not pass, the ASVeri is discarded. After the verification of the $Sig_{AS\_AAC2}$ by the AAC passes, S106 is executed. When the AAC determines that the REQ is legal, S107 is executed. When the AAC determines that the REQ is illegal, the AAC chooses whether to execute S107 according to the local policy. Considering the efficiency, the solution is not to execute and end this authentication process.

S108: The REQ decrypts the $EncData_{AAC}$ using the message encryption key to obtain the first authentication result information $Pub_{AAC}$ and the first digital signature $Sig_{AS\_REQ1}$.

Since the $EncData_{AAC}$ is obtained by the AAC through encrypting the to-be-encrypted data including the $Pub_{AAC}$ and $Sig_{AS\_REQ1}$ using the message encryption key and the symmetric encryption algorithm, the REQ can decrypt the $EncData_{AAC}$ using the message encryption key and the symmetric encryption algorithm to obtain the $Pub_{AAC}$ and $Sig_{AS\_REQ1}$ after receiving the $EncData_{AAC}$.

S109: The REQ verifies the first digital signature $Sig_{AS\_REQ1}$ using the public key of the AS-REQ.

After the verification passes, S110 is executed.

S110: The REQ determines an identity authentication result of the AAC according to the first verification result $Res_{AAC}$ in the first authentication result information $Pub_{AAC}$.

Since the $Res_{AAC}$ can reflect whether the AAC is legal, the REQ can determine whether the AAC is legal according to the $Res_{AAC}$ in the $Pub_{AAC}$ after the verification of the $Sig_{AS\_REQ1}$ by the REQ passes, thus laying the foundation for ensuring that the REQ can access the legal network.

As can be seen from the above technical solution, when the identity information is transmitted in the identity authentication process between the request device and the authentication access controller, the identity information of the request device and the authentication access controller is kept secret, which can prevent the identity information from being exposed in the transmission process, and ensure that the attacker cannot obtain the private and sensitive information; and the involving of the authentication server realizes the real-time mutual identity authentication between the request device and the authentication access controller while ensuring the confidentiality of the entity identity-related information, thereby laying the foundation for ensuring that only legal users can communicate with legal networks.

Please referring to FIG. 1, the consistency of identities and/or random numbers in the message can also be verified in the identity authentication process, to ensure the reliability and freshness of the authentication result. The details are as follows.

In some embodiments, the AACVeri of S103 may further include the identity identifier $ID_{AAC}$ of the AAC and/or the first random number $Nonce_{AAC}$ generated by the AAC; and correspondingly, the ASVeri of S104 further includes $ID_{AAC}$ and/or $Nonce_{AAC}$. It should be noted that the AS-AAC may transfer the $ID_{AAC}$ and/or $Nonce_{AAC}$ in the subsequent interaction messages after receiving the AACVeri, for example, send the $ID_{AAC}$ and/or $Nonce_{AAC}$ to the AAC through the ASVeri. Under normal circumstances, the $ID_{AAC}$ and/or $Nonce_{AAC}$ in the ASVeri is/are the same as the $ID_{AAC}$ and/or $Nonce_{AAC}$ in the AACVeri. But in the transmission process, if the case such as network jitter or attack occurs, the parameter information in the message may be lost or tampered, so the AAC can verify the consistency between the $ID_{AAC}$ and/or $Nonce_{AAC}$ in the ASVeri and the AAC's own identity identifier $ID_{AAC}$ and/or the $Nonce_{AAC}$ generated by the AAC (that is, the $ID_{AAC}$ and/or $Nonce_{AAC}$ sent by the AAC through the AACVeri) before S106; and if the verification passes, then the AAC executes S106 to determine the identity authentication result of the REQ according to the $Res_{REQ}$.

Similarly, the REQInit of S101 may further include the second random number $Nonce_{REQ}$ generated by the REQ and/or the to-be-encrypted data of the identity information ciphertext $EncData_{REQ}$ in the REQInit may further include the identity identifier $ID_{REQ}$ of the REQ, then the AAC decrypts the $EncData_{REQ}$ to obtain the $ID_{REQ}$; and correspondingly, the AACVeri of S103 further includes $Nonce_{REQ}$ and/or $ID_{REQ}$, the ASVeri of S104 further includes $Nonce_{REQ}$ and/or $ID_{REQ}$, and the to-be-encrypted data of the identity authentication result information $EncData_{AAC}$ in the AACAuth of S107 further includes $Nonce_{REQ}$ and/or $ID_{REQ}$. Correspondingly, before S110, the REQ can verify the consistency between the $Nonce_{REQ}$ and/or $ID_{REQ}$ obtained by decrypting the $EncData_{AAC}$ and the $Nonce_{REQ}$ generated by the REQ and/or the REQ' own identity identifier $ID_{REQ}$; and if the verification passes, then the REQ executes S110 to determine the identity authentication result of the AAC according to the $Res_{AAC}$.

In other embodiments, the REQInit of S101 may further include the digital signature $Sig_{REQ}$ of the REQ, and the to-be-signed data of the $Sig_{REQ}$ includes other fields before the $Sig_{REQ}$ in the REQInit. Then the AAC also needs to determine whether the verification of the $Sig_{REQ}$ passes before S106, and can execute S106 only when the verification passes. Here, the AAC determines whether the verification of the $Sig_{REQ}$ passes by: (1) the AAC verifies the $Sig_{REQ}$ using the $Cert_{REQ}$ obtained by decrypting the $EncData_{REQ}$ in the REQInit of S101, and determines whether the verification of the $Sig_{REQ}$ passes according to the verification result; (2) when the $Pub_{REQ}$ in the ASVeri of S104 further includes the $Cert_{REQ}$, the AAC can firstly verify the consistency between the $Cert_{REQ}$ in the $Pub_{REQ}$ and the $Cert_{REQ}$ obtained by decrypting the $EncData_{REQ}$; and if the $Cert_{REQ}$ in the $Pub_{REQ}$ is consistent with the $Cert_{REQ}$ obtained by decrypting the $EncData_{REQ}$, then the AAC verifies the $Sig_{REQ}$ using the $Cert_{REQ}$ in the $Pub_{REQ}$ and determines whether the verification of the $Sig_{REQ}$ passes according to the verification result; where the AAC may not verify the consistency between the $Cert_{REQ}$ in the $Pub_{REQ}$ and the $Cert_{REQ}$ obtained by decrypting the $EncData_{REQ}$, but directly verify the $Sig_{REQ}$ using the $Cert_{REQ}$ in the $Pub_{REQ}$; (3) the $Sig_{REQ}$ may also be verified by the AS-REQ trusted by the REQ, and in this case, the $Sig_{REQ}$ may be carried in other messages (for example, the AACVeri of S103, the AS-AACVeri sent by the AS-AAC to the AS-REQ) and transferred to the AS-REQ, and the AS-REQ verifies the $Sig_{REQ}$ using the received $Cert_{REQ}$. After the verification passes, the AS-REQ and AS-AAC will execute the subsequent procedures. Therefore, if the AAC can receive the ASVeri of S104, the AAC determines that the verification of the $Sig_{REQ}$ passes.

In other embodiments, the AACVeri of S103 may further include the digital signature $Sig_{AAC}$ of the AAC, and the to-be-signed data of the $Sig_{AAC}$ includes other fields before the $Sig_{AAC}$ in the AACVeri. Then the REQ also needs to determine whether the verification of the $Sig_{AAC}$ passes before S110, and can execute S110 only when the verification passes. Here, the REQ determines whether the verification of the $Sig_{AAC}$ passes in the following manner: the AS-AAC trusted by the AAC verifies the $Sig_{AAC}$ using the $Cert_{AAC}$ in the AACVeri. After the verification passes, the AS-AAC, AS-REQ and AAC will perform the subsequent procedures. Therefore, if the REQ can receive the AACAuth of S107, the REQ determines that the verification of the $Sig_{AAC}$ passes.

Similarly, the AACAuth of S107 may further include the digital signature $Sig_{AAC}$ of the AAC, and the to-be-signed data of the $Sig_{AAC}$ includes other fields before the $Sig_{AAC}$ in the AACAuth; and correspondingly, in the AACAuth, the $Pub_{AAC}$ in the to-be-encrypted data of the $EncData_{AAC}$ further includes $Cert_{AAC}$; and then the REQ also needs to determine whether the verification of the $Sig_{AAC}$ passes before S110, and can execute S110 only when the verification passes. Here, the REQ determines whether the verification of the $Sig_{AAC}$ passes in the following manner: the REQ verifies the $Sig_{AAC}$ using the $Cert_{AAC}$ in the $Pub_{AAC}$ obtained by decrypting the $EncData_{AAC}$, and determines whether the verification of the $Sig_{AAC}$ passes according to the verification result.

In some other embodiments, in order to ensure the reliability of the authentication result, the AACAuth of S107 may further include a message integrity check code $MacTag_{AAC}$, $MacTag_{AAC}$ is generated by the AAC through calculating other fields than the $MacTag_{AAC}$ in the AACAuth using a message integrity check key; and then the REQ also needs to verify the $MacTag_{AAC}$ using the message integrity check key before S110; and if the verification passes, then the REQ executes S110. When verifying the $MacTag_{AAC}$, the REQ may use the message integrity check key to calculate other fields than the $MacTag_{AAC}$ in the AACAuth to generate the $MacTag_{AAC}$, and compare the calculated $MacTag_{AAC}$ with the $MacTag_{AAC}$ in the received AACAuth. If the calculated $MacTag_{AAC}$ is consistent with the $MacTag_{AAC}$ in the received AACAuth, then the verification passes; otherwise, the verification fails. Here, the generation method of the message integrity check key used by the REQ and AAC will be described in the next embodiment.

Figure 2:
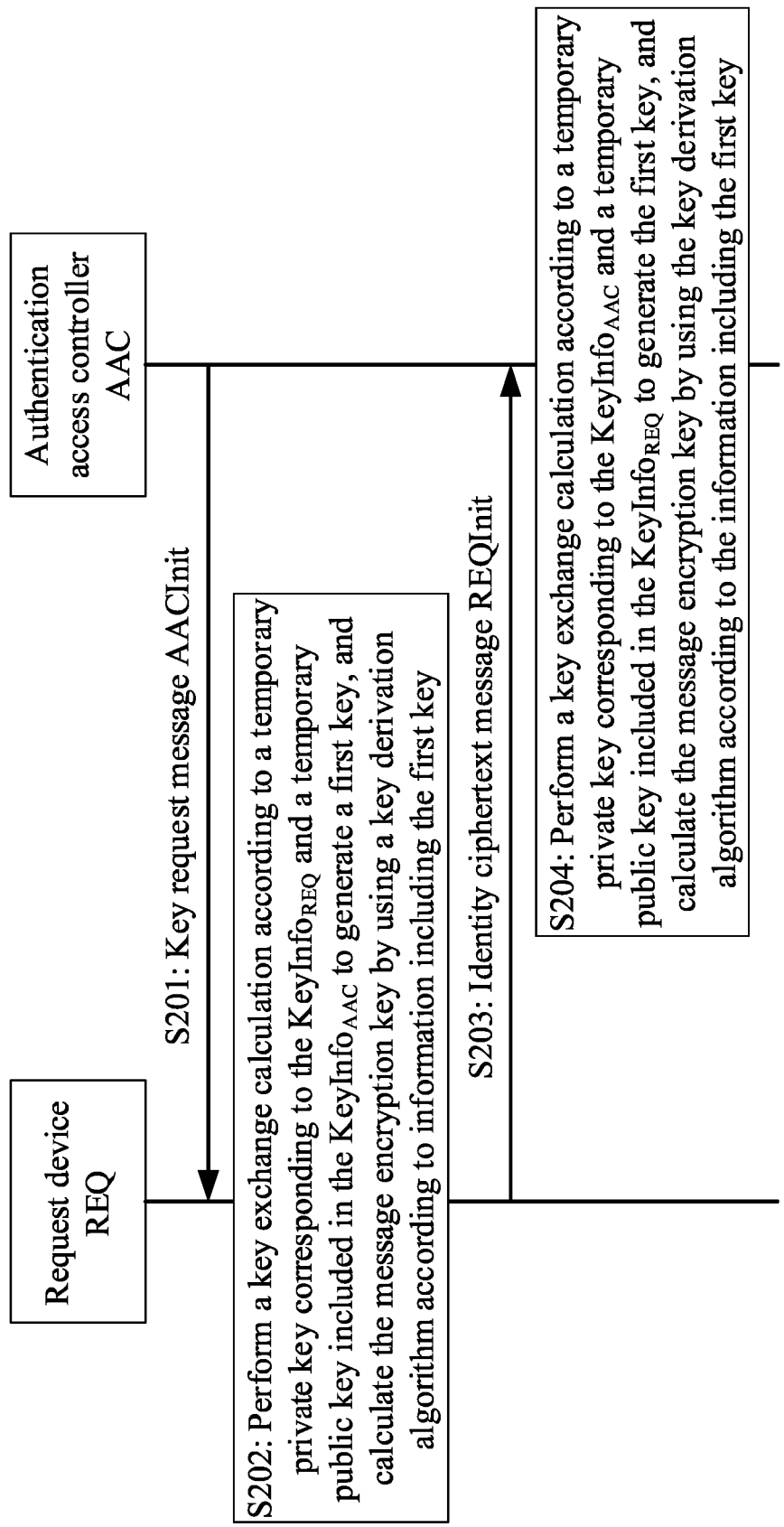
FIG. 2 is a schematic diagram of a method for negotiating a message encryption key between a request device REQ and an authentication access controller AAC according to an embodiment of the present application.

In the above embodiment, the message encryption key used by the REQ and AAC can be obtained through negotiation, so this embodiment further provides a method for the REQ and AAC to negotiate a message encryption key. Referring to FIG. 2, the method includes following steps.

S201: The AAC sends a key request message AACInit to the REQ.

The AACInit includes a key exchange parameter $KeyInfo_{AAC}$ of the AAC, and the $KeyInfo_{AAC}$ includes a temporary public key of the AAC, where the key exchange refers to a key exchange algorithm such as Diffie-Hellman (DH for short). The AACInit may further include the first random number $Nonce_{AAC}$ generated by the AAC.

The AACInit may further include Security capabilities$_{AAC}$, the Security capabilities$_{AAC}$ represents the security capability parameter information supported by the AAC and includes an identity authentication suite (the identity authentication suite includes one or more identity authentication methods), one or more symmetric encryption algorithms, one or more integrity verification algorithms and/or one or more key derivation algorithms, etc. supported by the AAC, for the REQ to select the used specific security policy. Then the REQ can select the specific security policy Security capabilities$_{REQ}$ used by the REQ according to the Security capabilities$_{AAC}$. The Security capabilities$_{REQ}$ represents the identity authentication method, symmetric encryption algorithm, integrity verification algorithm and/or key derivation algorithm that the REQ correspondingly determines to use.

S202: The REQ performs a key exchange calculation according to a temporary private key corresponding to a key exchange parameter $KeyInfo_{REQ}$ of the REQ and a temporary public key included in the $KeyInfo_{AAC}$ to generate a first key, and calculates the message encryption key by using a key derivation algorithm according to information including the first key.

If the AACInit in S201 further includes the $Nonce_{AAC}$ generated by the AAC, then the REQ may perform the key exchange calculation according to the temporary private key corresponding to the $KeyInfo_{REQ}$ and the temporary public key included in the $KeyInfo_{AAC}$ to generate the first key K1, combine K1 with the information including the $Nonce_{AAC}$ and the second random number $Nonce_{REQ}$ generated by the REQ, and calculate the message encryption key by using the negotiated or preset key derivation algorithm. The negotiated key derivation algorithm may be a key derivation algorithm selected and used by the REQ according to the Security capabilities$_{AAC}$ sent by the AAC. Here, the $KeyInfo_{REQ}$ is the key exchange parameter generated by the REQ, and includes the temporary public key of the REQ. The temporary private key corresponding to the $KeyInfo_{REQ}$ is a temporary private key generated by the REQ corresponding to the temporary public key of the REQ, that is, the temporary public key and the temporary private key are a temporary public-private key pair.

S203: The REQ sends an identity ciphertext message REQInit to the AAC.

The REQInit includes the $KeyInfo_{REQ}$, so that the AAC can calculate the message encryption key according to the information including the temporary private key corresponding to the $KeyInfo_{AAC}$ and the temporary public key included in the $KeyInfo_{REQ}$. The temporary private key corresponding to the $KeyInfo_{AAC}$ is a temporary private key generated by the AAC corresponding to the temporary public key of the AAC, that is, the temporary public key and the temporary private key are a temporary public-private key pair.

The REQInit may further include Security capabilities$_{REQ}$. The REQInit may further include $Nonce_{REQ}$, so that the AAC can calculate the message encryption key according to the information including the temporary private key corresponding to the $KeyInfo_{AAC}$, the temporary public key included in the $KeyInfo_{REQ}$, the $Nonce_{AAC}$ and the $Nonce_{REQ}$.

The REQInit may further include the $Nonce_{AAC}$, and then the AAC may verify the consistency between the $Nonce_{AAC}$ in the REQInit and the $Nonce_{AAC}$ generated by the AAC before calculating the message encryption key, so as to ensure that the REQInit received by the AAC is a response message to the AACInit.

S204: The AAC performs a key exchange calculation according to a temporary private key corresponding to the $KeyInfo_{AAC}$ and a temporary public key included in the $KeyInfo_{REQ}$ to generate the first key, and calculates the message encryption key by using the key derivation algorithm according to the information including the first key.

If the REQInit further includes the $Nonce_{REQ}$, the AAC can perform the key exchange calculation according to the temporary private key corresponding to the $KeyInfo_{AAC}$ and the temporary public key included in the $KeyInfo_{REQ}$ to generate the first key K1, combine K1 with the information including the $Nonce_{AAC}$ and the $Nonce_{REQ}$, and calculate the message encryption key by using the negotiated or preset key derivation algorithm, where the negotiated key derivation algorithm may be a key derivation algorithm selected and used by the AAC according to the Security capabilities$_{REQ}$ sent by the REQ.

It should be noted that the REQ and AAC can also generate a message integrity check key in an embodiment of FIG. 2. The implementations in which the REQ and AAC respectively generate the message integrity check key are the same as the implementations in which the REQ and AAC respectively generate the message encryption key illustrated in an embodiment of FIG. 2. For example, the AAC may use the key derivation algorithm to derive a string of key data in the manner of an embodiment of FIG. 2, where the key data may be used as both the message encryption key and the message integrity check key, or one part of the key data is used as the message encryption key and the other part of the key data is used as the message integrity check key; or the AAC may use the key derivation algorithm to derive two strings of same or different key data respectively in the manner of an embodiment of FIG. 2, where one string is used as the message encryption key, and the other string is used as the message integrity check key. The REQ may use the key derivation algorithm to derive a string of key data in the manner of an embodiment of FIG. 2, where the key data may be used as both the message encryption key and the message integrity check key, or one part of the key data is used as the message encryption key and the other part of the key data is used as the message integrity check key; or the REQ may use the key derivation algorithm to derive two strings of same or different key data respectively in the manner of an embodiment of FIG. 2, where one string is used as the message encryption key, and the other string is used as the message integrity check key.

An embodiment of the present application further provides a method of using information interaction between the AAC and REQ to determine the first authentication server and/or the second authentication server used in this authentication process.

Please referring to FIG. 2, the AAC adds the identity identifier $ID_{AS\_AAC}$ of at least one authentication server trusted by the AAC to the AACInit of S201, and then the REQ determines the identity identifier $ID_{AS\_REQ}$ of at least one authentication server trusted by the REQ according to the $ID_{AS\_AAC}$. During specific implementation, the REQ selects at least one authentication server that is trusted by the REQ from the $ID_{AS\_AAC}$ as the $ID_{AS\_REQ}$. If the selection fails, the REQ takes at least one authentication server trusted by the REQ as the $ID_{AS\_REQ}$ (where the selection success corresponds to the non-roaming case, and the selection failure corresponding to the roaming case), and the $ID_{AS\_REQ}$ is added to the REQInit of S203 and sent to the AAC. Furthermore, the AAC can determine the first authentication server according to the $ID_{AS\_AAC}$ and $ID_{AS\_REQ}$. For example, the AAC can determine whether there is an identity identifier of at least one same authentication server in the $ID_{AS\_REQ}$ and $ID_{AS\_AAC}$; if so, the case is a non-roaming case, and the AAC determines the first authentication server participating in the identity authentication process from the identity identifier of at least one authentication server trusted by the REQ and AAC; if not, the case is a roaming case, and the AAC needs to determine the first authentication server AS-AAC participating in the identity authentication process according to the $ID_{AS\_AAC}$ and send the $ID_{AS\_REQ}$ to the AS-AAC, so that the AS-AAC determines the second authentication server AS-REQ according to the $ID_{AS\_REQ}$.

As another embodiment, the AAC does not need to send the $ID_{AS\_AAC}$ to the REQ, but the REQ adds the identity identifier $ID_{AS\_REQ}$ of at least one authentication server trusted by the REQ in the REQInit of S203. The specific implementation of determining the first authentication server and/or the second authentication server participating in the identity authentication process according to the $ID_{AS\_REQ}$ and the identity identifier $ID_{AS\_AAC}$ of the authentication server trusted by the AAC is the same as the previous embodiment.

The authentication servers trusted by the REQ and AAC may be the same or different. When the authentication servers trusted by the REQ and AAC are the same, the case is a non-roaming case; when the authentication servers trusted by the REQ and AAC are different, the case is a roaming case.

Figure 3:
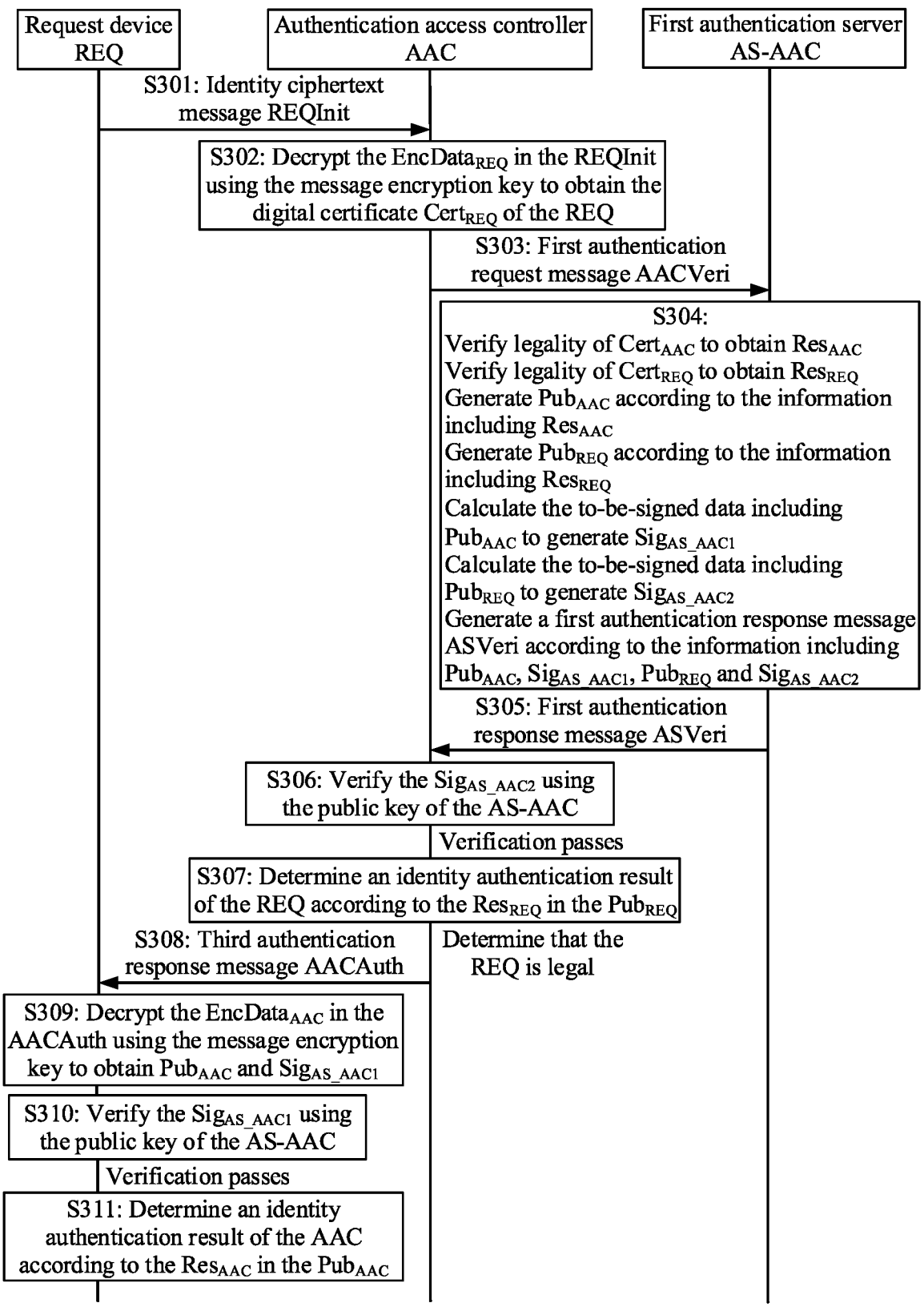
FIG. 3 is a schematic diagram of an identity authentication method in a case of non-roaming according to an embodiment of the present application.

Referring to FIG. 3, FIG. 3 is an embodiment of the identity authentication method in the non-roaming case, where the authentication server trusted by both the REQ and AAC may be represented by AS-AAC (or AS-REQ). Before this embodiment is performed, both the REQ and AAC already have a message encryption key, the message encryption key may be pre-shared by the REQ and AAC or may be obtained by negotiation through the method shown in FIG. 2. The identity authentication method includes following steps.

S301: An AAC obtains an identity ciphertext message REQInit sent by an REQ.

The REQInit includes the identity information ciphertext $EncData_{REQ}$ of the REQ.

S302: The AAC decrypts the $EncData_{REQ}$ in the REQInit using the message encryption key to obtain the digital certificate $Cert_{REQ}$ of the REQ.

S303: The AAC sends a first authentication request message AACVeri to the AS-AAC.

The AACVeri includes the $Cert_{REQ}$ and a digital certificate $Cert_{AAC}$ of the AAC.

S304: The AS-AAC performs the legality verification on the $Cert_{AAC}$ to obtain the $Res_{AAC}$, generates the first authentication result information $Pub_{AAC}$ according to the information including the $Res_{AAC}$, performs a legality verification on the $Certa_{REQ}$ to obtain the $Res_{REQ}$, generates the second authentication result information $Pub_{REQ}$ according to the information including the $Res_{REQ}$, calculates the to-be-signed data including the $Pub_{AAC}$ to generate a first digital signature $Sig_{AS\_AAC1}$, calculates the to-be-signed data including the $Pub_{REQ}$ to generate a second digital signature $Sig_{AS\_AAC2}$, and generates a first authentication response message ASVeri according to the information including the $Pub_{AAC}$, $Sig_{AS\_AAC1}$, $Pub_{REQ}$ and $Sig_{AS\_AAC2}$.

S305: The AAC receives the first authentication response message ASVeri sent by the AS-AAC.

The ASVeri includes $Pub_{AAC}$, $Sig_{AS\_AAC1}$, $Pub_{REQ}$ and $Sig_{AS\_AAC2}$.

S306: The AAC verifies the $Sig_{AS\_AAC2}$ using the public key of the AS-AAC.

If the verification passes, S307 is executed.

S307: The AAC determines an identity authentication result of the REQ according to the $Res_{REQ}$ in the $Pub_{REQ}$.

If the AAC determines that the REQ is legal, S308 is executed.

S308: The AAC sends a third authentication response message AACAuth to the REQ.

The AACAuth includes an identity authentication result information ciphertext $EncData_{AAC}$.

S309: The REQ decrypts the $EncData_{AAC}$ in the AACAuth using the message encryption key to obtain the first authentication result information $Pub_{AAC}$ and the first digital signature $Sig_{AS\_AAC1}$.

S310: The REQ verifies the $Sig_{AS\_AAC1}$ using the public key of the AS-AAC.

If the verification passes, S311 is executed.

S311: The REQ determines an identity authentication result of the AAC according to the $Res_{AAC}$ in the $Pub_{AAC}$.

Figure 4:
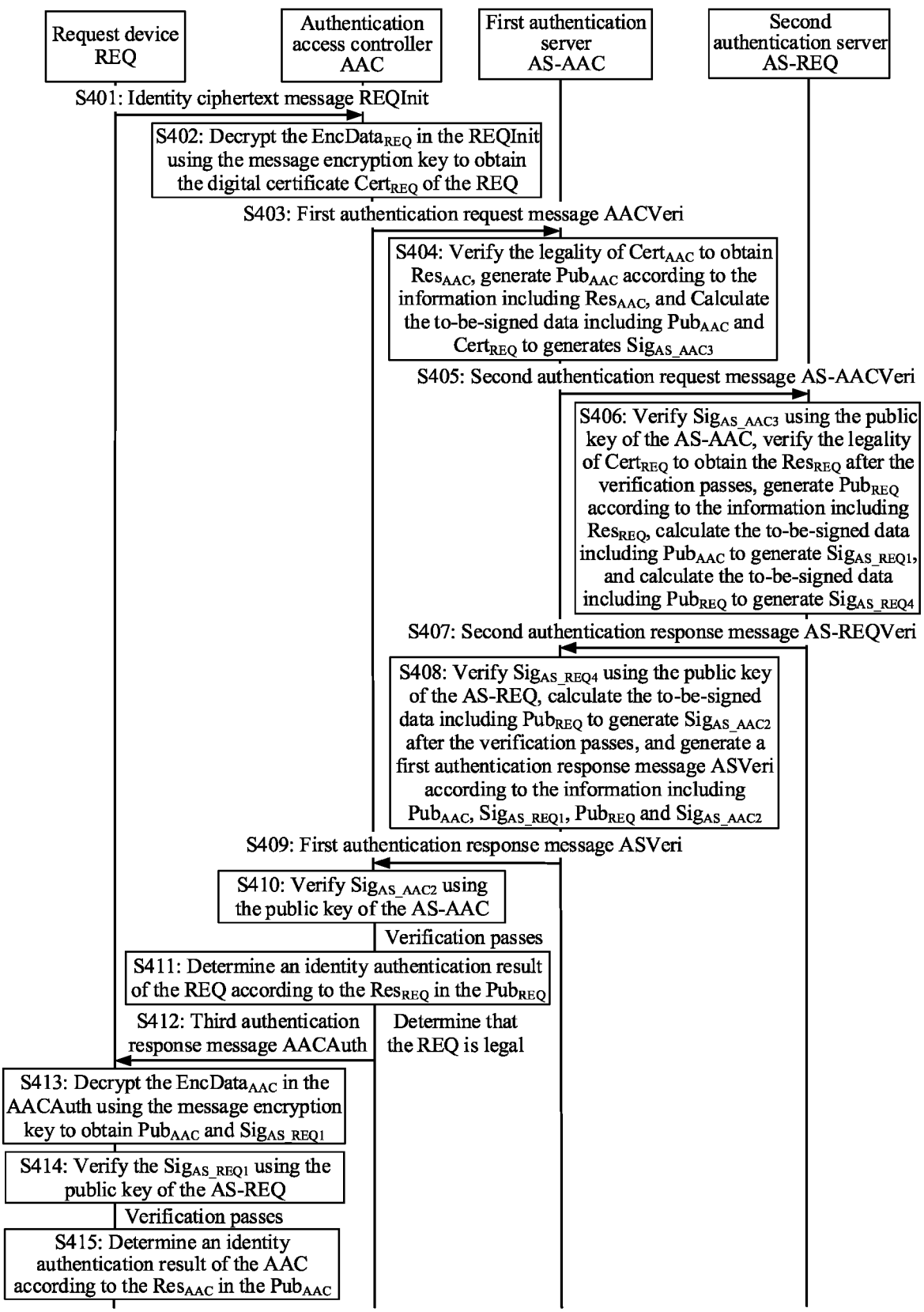
FIG. 4 is a schematic diagram of an identity authentication method in a case of roaming according to an embodiment of the present application.

Referring to FIG. 4, FIG. 4 is an embodiment of the identity authentication method in the roaming case. In this case, the AS-AAC and AS-REQ trust each other and know each other's digital certificate or the public key in the digital certificate. Before this embodiment is performed, both the REQ and AAC already have a message encryption key, the message encryption key may be pre-shared by the REQ and AAC or may be obtained by negotiation through the method shown in FIG. 2. The identity authentication method includes following steps.

S401: An AAC obtains an identity ciphertext message REQInit sent by an REQ.

The REQInit includes the identity information ciphertext $EncData_{REQ}$ of the REQ.

S402: The AAC decrypts the $EncData_{REQ}$ in the REQInit using the message encryption key to obtain the $Cert_{REQ}$.

S403: The AAC sends a first authentication request message AACVeri to the AS-AAC.

The AACVeri includes $Cert_{REQ}$ and $Cert_{AAC}$.

S404: The AS-AAC performs the legality verification on the $Cert_{AAC}$ to obtain the $Res_{AAC}$, generates the first authentication result information $Pub_{AAC}$ according to the information including the $Res_{AAC}$, and calculates the to-be-signed data including the $Pub_{AAC}$ and $Cert_{REQ}$ to generates a third digital signature $Sig_{AS\_AAC3}$.

S405: The AS-AAC sends a second authentication request message AS-AACVeri to the AS-REQ.

The AS-AACVeri includes $Pub_{AAC}$, $Cert_{REQ}$ and $Sig_{AS\_AAC3}$.

S406: The AS-REQ verifies the $Sig_{AS\_AAC3}$ using the public key of the AS-AAC, performs the legality verification on the $Cert_{REQ}$ to obtain the $Res_{REQ}$ after the verification passes, generates the second authentication result information $Pub_{REQ}$ according to the information including the $Res_{REQ}$, calculates the to-be-signed data including the $Pub_{AAC}$ to generate a first digital signature $Sig_{AS\_REQ1}$, and calculates the to-be-signed data including the $Pub_{REQ}$ to generate a fourth digital signature $Sig_{AS\_REQ4}$.

S407: The AS-REQ sends a second authentication response message AS-REQVeri to the AS-AAC.

The AS-REQVeri includes the first authentication result information $Pub_{AAC}$, the first digital signature $Sig_{AS\_REQ1}$, the second authentication result information $Pub_{REQ}$ and the fourth digital signature $Sig_{AS\_REQ4}$.

S408: The AS-AAC verifies the $Sig_{AS\_REQ4}$ using the public key of the AS-REQ, calculates the to-be-signed data including the $Pub_{REQ}$ to generate a second digital signature $Sig_{AS\_AAC2}$ after the verification passes, and generates a first authentication response message ASVeri according to the information including the $Pub_{AAC}$, $Sig_{AS\_REQ1}$, $Pub_{REQ}$ and $Sig_{AS\_AAC2}$.

S409: The AAC receives the first authentication response message ASVeri sent by the AS-AAC.

The ASVeri includes $Pub_{AAC}$, $Sig_{AS\_REQ1}$, $Pub_{REQ}$ and $Sig_{AS\_AAC2}$.

S410: The AAC verifies the $Sig_{AS\_AAC2}$ using the public key of the AS-AAC.

If the verification passes, S411 is executed.

S411: The AAC determines an identity authentication result of the REQ according to the $Res_{REQ}$ in the $Pub_{REQ}$.

If the AAC determines that the REQ is legal, S412 is executed.

S412: The AAC sends a third authentication response message AACAuth to the REQ.

The AACAuth includes an identity authentication result information ciphertext $EncData_{AAC}$.

S413: The REQ decrypts the $EncData_{AAC}$ in the AACAuth using the message encryption key to obtain the first authentication result information $Pub_{AAC}$ and the first digital signature $Sig_{AS\_REQ1}$.

S414: The REQ verifies the $Sig_{AS\_REQ1}$ using the public key of the AS-REQ.

If the verification passes, S415 is executed.

S415: The REQ determines an identity authentication result of the AAC according to the $Res_{AAC}$ in the $Pub_{AAC}$.

Figure 5:
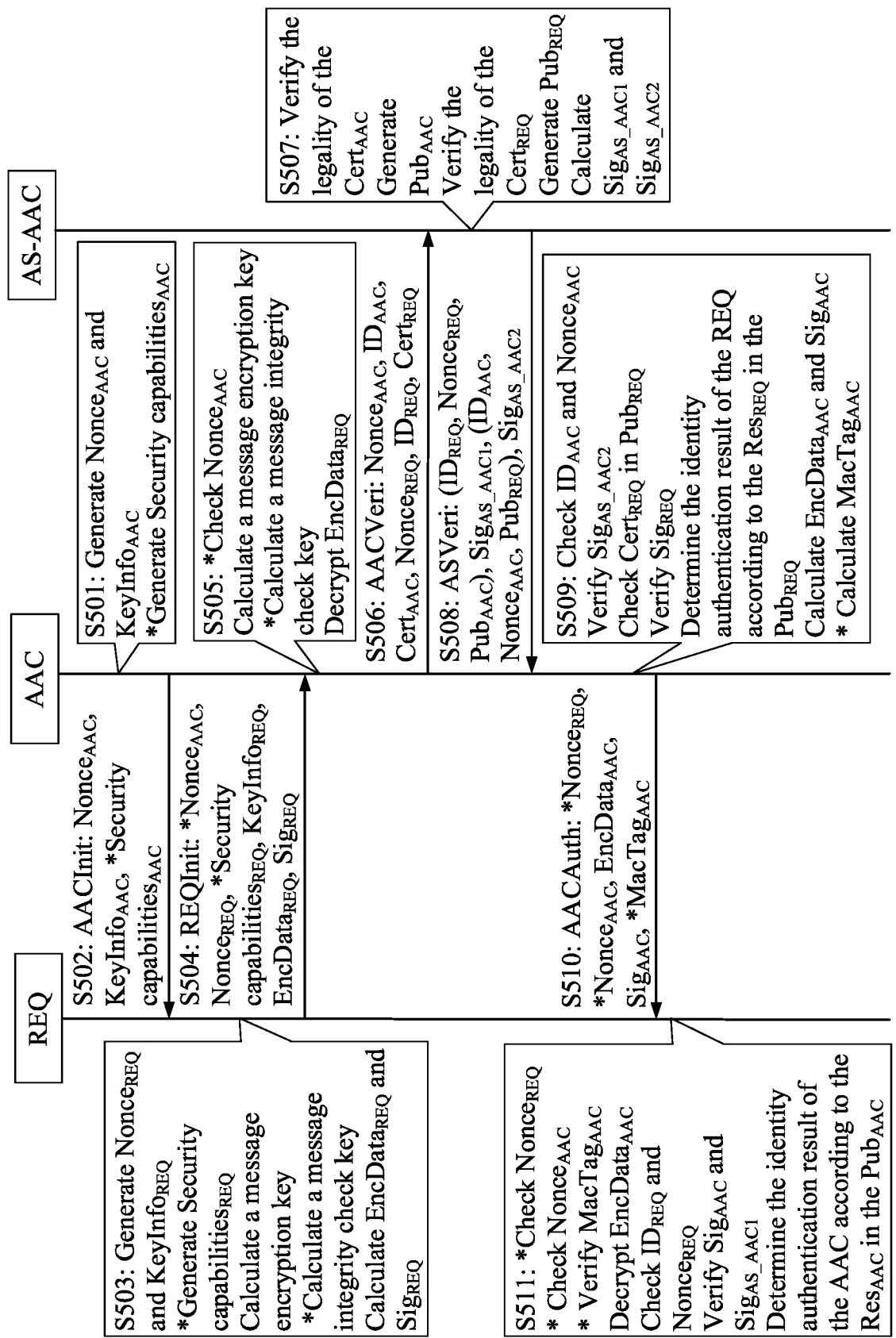
FIG. 5 is a schematic diagram of another identity authentication method in a case of non-roaming according to an embodiment of the present application, where "*" represents an optional field or an optional operation.

Referring to FIG. 5, FIG. 5 is an embodiment of the identity authentication method in the non-roaming case. At this time, the authentication server trusted by both the REQ and AAC may be represented by AS-AAC (or AS-REQ). In this embodiment, the negotiation process of the message encryption key between the REQ and AAC is merged into the identity authentication process in parallel, which is more convenient for engineering implementation. The identity authentication method includes following steps.

S501: The AAC generates $Nonce_{AAC}$ and $KeyInfo_{AAC}$, and generates Security capabilities$_{AAC}$ as required.

S502: The AAC sends a key request message AACInit to the REQ.

The AACInit includes $Nonce_{AAC}$, $KeyInfo_{AAC}$ and Security capabilities$_{AAC}$, where the Security capabilities$_{AAC}$ is an optional field, represents the security capability parameter information supported by the AAC, and includes an identity authentication suite, one or more symmetric encryption algorithms, one or more integrity verification algorithms and/or one or more key derivation algorithms supported by the AAC (the same for the full text).

S503: The REQ generates $Nonce_{REQ}$ and $KeyInfo_{REQ}$, generates Security capabilities$_{REQ}$ as required, performs the key exchange calculation according to the temporary private key corresponding to the $KeyInfo_{REQ}$ and the temporary public key included in the $KeyInfo_{AAC}$ to generate a first key K1, combines K1 with the $Nonce_{AAC}$, $Nonce_{REQ}$ and other information (other information used by the REQ and AAC is the same and optional, such as a specific character string, etc.), calculates a message encryption key and a message integrity check key using the negotiated or preset key derivation algorithm; calculates the identity information ciphertext $EncData_{REQ}$ of the REQ using the message encryption key and the symmetric encryption algorithm; and calculates $Sig_{REQ}$.

Here, the Security capabilities$_{REQ}$ represents the selection of a specific security policy made by the REQ according to the Security capabilities$_{AAC}$, that is, the identity authentication method, symmetric encryption algorithm, integrity verification algorithm and/or key derivation algorithm determined by the REQ for use; and the REQ calculates the message integrity check key as an optional operation, and this step can be performed later when needed.

S504: The REQ sends an identity ciphertext message REQInit to the AAC.

The REQInit includes $Nonce_{AAC}$, $Nonce_{REQ}$, Security capabilities$_{REQ}$, $KeyInfo_{REQ}$, $EncData_{REQ}$ and $Sig_{REQ}$, where the $Nonce_{AAC}$ and Security capabilities$_{REQ}$ are optional fields, and the $Nonce_{AAC}$ should be the same as the $Nonce_{AAC}$ in the AACInit; whether the REQ generates the Security capabilities$_{REQ}$ depends on whether the Security capabilities$_{AAC}$ is carried in the AACInit sent by the AAC to the REQ. The to-be-encrypted data of the $EncData_{REQ}$ includes $ID_{REQ}$ and $Cert_{REQ}$. The to-be-signed data of the $Sig_{REQ}$ includes other fields before the $Sig_{REQ}$ in the REQInit. For example, when the REQInit includes $Nonce_{AAC}$, $Nonce_{REQ}$, Security capabilities$_{REQ}$, $KeyInfo_{REQ}$, $EncData_{REQ}$ and $Sig_{REQ}$ in sequence, the to-be-signed data of the $Sig_{REQ}$ includes $Nonce_{AAC}$, $Nonce_{REQ}$, Security capabilities$_{REQ}$, $KeyInfo_{REQ}$ and $EncData_{REQ}$; and furthermore, when the REQInit does not include the $Nonce_{AAC}$ field, the to-be-signed data of the $Sig_{REQ}$ further includes the $Nonce_{AAC}$ field in the AACInit. In the present application, the signed object is called to-be-signed data.

S505: After receiving the REQInit, the AAC performs the following operations (if there is no special description or logical relationship, the actions numbered in (1), (2) and the like herein do not have a necessary sequence because of the numbers. The same for the full text).

(1) If there is $Nonce_{AAC}$ in the REQInit, then check whether the $Nonce_{AAC}$ is the same as the $Nonce_{AAC}$ generated by the AAC; if not, discard the REQInit.

(2) Perform the key exchange calculation according to the temporary private key corresponding to the $KeyInfo_{AAC}$ and the temporary public key included in the $KeyInfo_{REQ}$ to generate a first key K1, combine K1 with the $Nonce_{AAC}$, $Nonce_{REQ}$ and other information (other information used by the AAC and REQ is the same and optional, such as a specific character string, etc.), and calculates a message encryption key and a message integrity check key using the negotiated or preset key derivation algorithm; and the AAC calculates the message integrity check key as an optional operation, and this step can be performed later when needed.

(3) Decrypt the $EncData_{REQ}$ using the message encryption key and the symmetric encryption algorithm to obtain $Cert_{REQ}$ and $ID_{REQ}$.

S506: The AAC sends a first authentication request message AACVeri to the AS-AAC.

The AACVeri includes $Nonce_{AAC}$, $ID_{AAC}$, $Cert_{AAC}$, $Nonce_{REQ}$, $ID_{REQ}$ and $Cert_{REQ}$, where the $Nonce_{REQ}$, $ID_{REQ}$ and $Cert_{REQ}$ should be the same as the corresponding fields in the REQInit respectively, and the $Nonce_{AAC}$ should be the same as the $Nonce_{AAC}$ generated by the AAC.

S507: After receiving the AACVeri, the AS-AAC performs the following operations.

(1) Verify the legality of the $Cert_{AAC}$ to obtain the $Res_{AAC}$, generate the $Pub_{AAC}$ according to the information including the $Res_{AAC}$ and $Cert_{AAC}$, verify the legality of the $Cert_{REQ}$ to obtain the $ReS_{REQ}$, and generate the $Pub_{REQ}$ according to the information including the $ReS_{REQ}$ and $Cert_{REQ}$.

(2) Calculate a first digital signature $Sig_{AS\_AAC1}$ and a second digital signature $Sig_{AS\_AAC2}$.

S508: The AS-AAC sends a first authentication response message ASVeri to the AAC.

The ASVeri includes $ID_{REQ}$, $Nonce_{REQ}$, $Pub_{AAC}$, $Sig_{AS\_AAC1}$, $ID_{AAC}$, $Nonce_{AAC}$, $Pub_{REQ}$ and $Sig_{AS\_AAC2}$, where the $ID_{REQ}$, $Nonce_{REQ}$, $ID_{AAC}$ and $Nonce_{AAC}$ should be the same as the corresponding fields in the AACVeri respectively; the to-be-signed data of the $Sig_{AS\_AAC1}$ includes $ID_{REQ}$, $Nonce_{REQ}$ and $Pub_{AAC}$; and the to-be-signed data of the $Sig_{AS\_AAC2}$ includes $ID_{AAC}$, $Nonce_{AAC}$ and $Pub_{REQ}$.

S509: After receiving the ASVeri, the AAC performs the following operations.

(1) Check whether the $ID_{AAC}$ and $Nonce_{AAC}$ in the ASVeri are the same as the AAC's own identity identifier $ID_{AAC}$ and the $Nonce_{AAC}$ generated by the AAC respectively.

(2) Verify the $Sig_{AS\_AAC2}$ using the public key of the AS-AAC.

(3) Check whether the $Cert_{REQ}$ in the $Pub_{REQ}$ is the same as the $Cert_{REQ}$ obtained by decrypting the $EncData_{REQ}$.

(4) Verify the $Sig_{REQ}$ using the $Cert_{REQ}$.

(5) If any of the above checks and verifications fails, discard the ASVeri immediately; after the above checks and verifications all pass, determine the identity authentication result of the REQ according to the $Res_{REQ}$ in the $Pub_{REQ}$; if the REQ is determined to be illegal, then end this authentication process.

(6) Calculate $EncData_{AAC}$ using the message encryption key.

(7) Calculate $Sig_{AAC}$.

(8) Calculate $MacTag_{AAC}$ as required.

S510: The AAC sends a third authentication response message AACAuth to the REQ.

The AACAuth includes $Nonce_{REQ}$, $Nonce_{AAC}$, $EncData_{AAC}$, $Sig_{AAC}$ and $MacTag_{AAC}$, where the $Nonce_{REQ}$ and $Nonce_{AAC}$ are optional fields, which should be the same as the $Nonce_{REQ}$ in the REQInit and the $Nonce_{AAC}$ generated by the AAC respectively; the to-be-encrypted data of the $EncData_{AAC}$ includes $ID_{REQ}$, $Nonce_{REQ}$, $Pub_{AAC}$ and $Sig_{AS\_AAC1}$; and the $ID_{REQ}$, $Nonce_{REQ}$, $Pub_{AAC}$, $Sig_{AS\_AAC1}$ should be the same as the corresponding fields in the ASVeri respectively. The to-be-signed data of the $Sig_{AAC}$ includes other fields before the $Sig_{AAC}$ in the AACAuth. The $MacTag_{AAC}$ is an optional field, and the calculation process of the $MacTag_{AAC}$ is: calculating other fields than the $MacTag_{AAC}$ in the AACAuth using the message integrity check key and the integrity verification algorithm to generate the $MacTag_{AAC}$.

S511: After receiving the AACAuth, the REQ performs the following operations.

(1) If there is a $Nonce_{REQ}$ in the AACAuth, check whether the $Nonce_{REQ}$ is the same as the $Nonce_{REQ}$ generated by the REQ; and if there is a $Nonce_{AAC}$ in the AACAuth, check whether the $Nonce_{AAC}$ is the same as the $Nonce_{AAC}$ in the received AACInit.

(2) If there is a $MacTag_{AAC}$ in the AACAuth, verify the $MacTag_{AAC}$.

The verification process is: the REQ locally calculates other fields than the $MacTag_{AAC}$ in the AACAuth using the message integrity check key and the integrity verification algorithm to generate the $MacTag_{AAC}$ (this calculation manner is the same as the manner for the AAC to calculate the $MacTag_{AAC}$), and compares the calculated $MacTag_{AAC}$ with the $MacTag_{AAC}$ in the received AACAuth.

(3) Decrypt the $EncData_{AAC}$ using the message encryption key and the symmetric encryption algorithm to obtain the $ID_{REQ}$, $Nonce_{REQ}$, $Pub_{AAC}$ and $Sig_{AS\_AAC1}$.

(4) Check whether the $ID_{REQ}$ and $Nonce_{REQ}$ obtained by decryption are the same as the REQ's own identify $ID_{REQ}$ and the $Nonce_{REQ}$ generated by the REQ respectively.

(5) Verify the $Sig_{AS\_AAC1}$ using the public key of the AS-AAC, and verify the $Sig_{AAC}$ using the $Cert_{AAC}$ in the $Pub_{AAC}$.

(6) After the above checks and verifications all pass, determine the identity authentication result of the AAC according to the $Res_{AAC}$ in the $Pub_{AAC}$; if any of the above checks and verifications fails, discard the AACAuth immediately.

It should be noted that (1) the verification of $Sig_{REQ}$ in S509 may also be changed to be performed in S505, that is, the AAC verifies the $Sig_{REQ}$ using the $Cert_{REQ}$ after decrypting the $EncData_{REQ}$ to obtain the $Cert_{REQ}$. At this time, the $Pub_{REQ}$ may not include the $Cert_{REQ}$. Alternatively, the verification of $Sig_{REQ}$ in S509 may also be changed to be performed by the AS-AAC in S507. In this case, the $Sig_{REQ}$ is transferred to the AS-AAC through the AACVeri of S506, and the AS-AAC uses the received $Cert_{REQ}$ to verify the $Sig_{REQ}$. At this time, the $Pub_{REQ}$ may not include the $Cert_{REQ}$. (2) The operation of calculating the $Sig_{AAC}$ in S509 may also be changed to be performed in S506, that is, the AAC firstly performs the signature calculation on the information including $Nonce_{AAC}$, $ID_{AAC}$, $Cert_{AAC}$, $Nonce_{REQ}$, $ID_{REQ}$ and $Cert_{REQ}$ to generate the $Sig_{AAC}$ in S506, and then the AACVeri of S506 further includes the $Sig_{AAC}$. In S507, the AS-AAC also needs to verify the $Sig_{AA}C$. After the verification passes, the AS-AAC then performs subsequent operations. In this case, the AAC does not need to calculate the $Sig_{AAC}$ in S509, and correspondingly, the AACAuth of S510 does not include the $Sig_{AAC}$, and the REQ also no longer verifies the $Sig_{AAC}$ in S511. At this time, the $Pub_{AAC}$ may not include the $Cert_{AAC}$.

Figure 6:
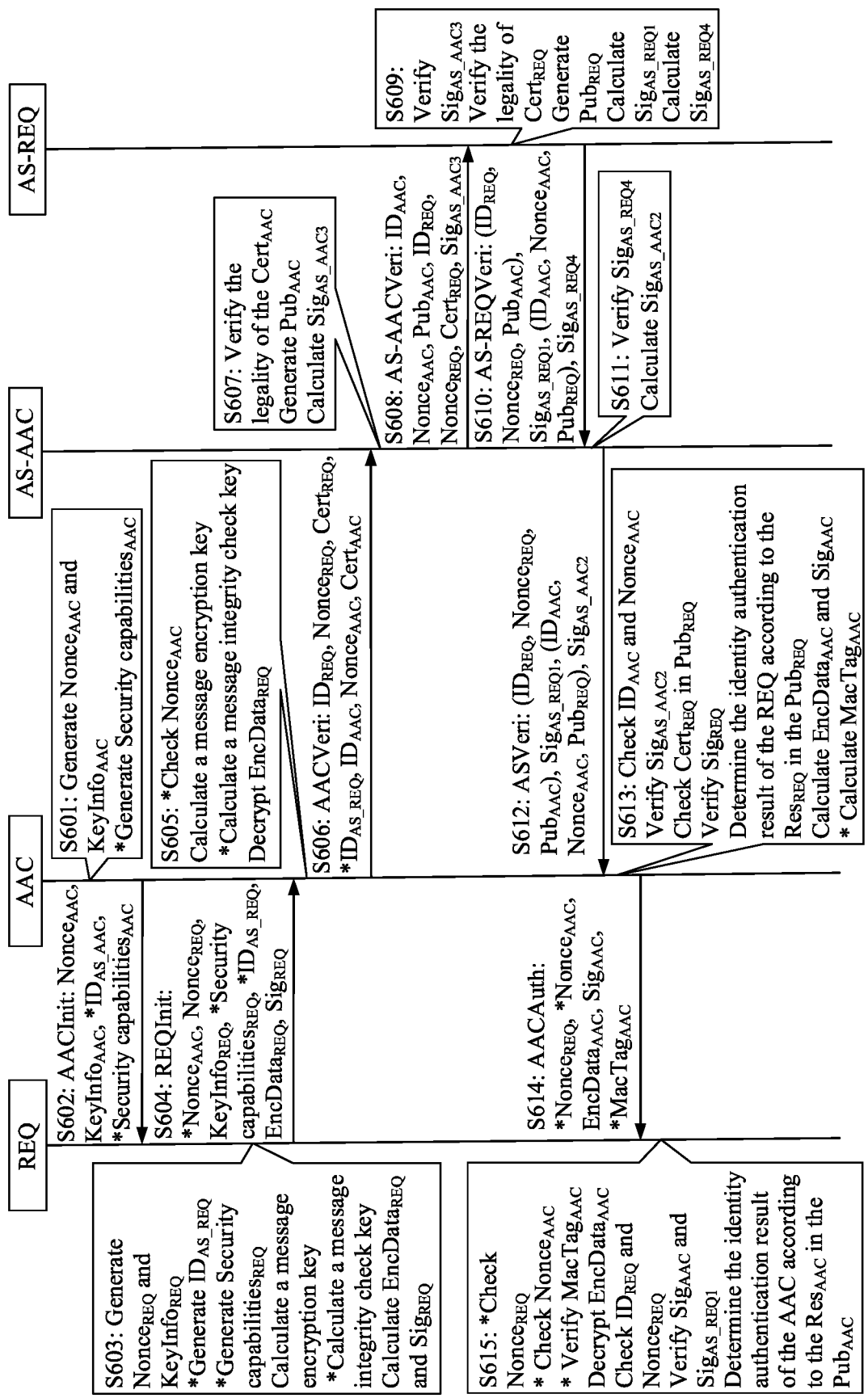
FIG. 6 is a schematic diagram of another identity authentication method in a case of roaming according to an embodiment of the present application, where "*" represents an optional field or an optional operation.

Referring to FIG. 6, FIG. 6 is an embodiment of the identity authentication method in the roaming case. In this embodiment, the negotiation process of the message encryption key between the REQ and AAC is merged into the identity authentication process in parallel, which is more convenient for engineering implementation. The identity authentication method includes following steps.

S601: The AAC generates $Nonce_{AAC}$ and $KeyInfo_{AAC}$, and generates Security capabilities$_{AAC}$ as required.

S602: The AAC sends a key request message AACInit to the REQ.

The AACInit includes $Nonce_{AAC}$, $KeyInfo_{AAC}$, $ID_{AS\_AAC}$ and Security capabilities$_{AAC}$, where the $ID_{AS\_AAC}$ and Security capabilities$_{AAC}$ are optional fields; and the $ID_{AS\_AAC}$ represents the identity identifier of at least one authentication server trusted by the AAC, and is used to enable the REQ to determine whether there is a commonly trusted authentication server according to the $ID_{AS\_AAC}$.

S603: The REQ generates $Nonce_{REQ}$ and $KeyInfo_{REQ}$, generates Security capabilities$_{REQ}$ and $ID_{AS\_REQ}$ as required, performs the key exchange calculation according to the temporary private key corresponding to the $KeyInfo_REQ$ and the temporary public key included in the $KeyInfo_{AAC}$ to generate a first key K1, combines K1 with the $Nonce_{AAC}$, $Nonce_{REQ}$ and other information (other information used by the REQ and AAC is the same and optional, such as a specific character string, etc.), calculates a message encryption key and a message integrity check key using the negotiated or preset key derivation algorithm; calculates the identity information ciphertext $EncData_{REQ}$ of the REQ using the message encryption key and the symmetric encryption algorithm; and calculates $Sig_{REQ}$.

Here, the Security capabilities$_{REQ}$ and $ID_{AS\_REQ}$ are optional fields; and the $ID_{AS\_REQ}$ represents the identity identifier of at least one authentication server trusted by the REQ. When the $ID_{AS\_AAC}$ exists in the AACInit, the REQ tries to select at least one authentication server that is the same as the $ID_{AS\_AAC}$ from the authentication servers trusted by the REQ as the $ID_{AS\_REQ}$. If the selection fails, at least one authentication server trusted by the REQ is used as the $ID_{AS\_REQ}$. When the $ID_{AS\_AAC}$ does not exist in the AACInit, the REQ uses at least one authentication server trusted by the REQ as the $ID_{AS\_REQ}$. The step in which the REQ calculates the message integrity check key is an optional operation, and this step can be performed later when needed.

S604: The REQ sends an identity ciphertext message REQInit to the AAC.

The REQInit includes Nonce$_{AAC}$, Nonce$_{REQ}$, KeyInfo$_{REQ}$, Security capabilities$_{REQ}$, $ID_{AS\_REQ}$, EncData$_{REQ}$ and Sig$_{REQ}$, where the Nonce$_{AAC}$, Security capabilities$_{REQ}$ and $ID_{AS\_REQ}$ are optional fields; the Nonce$_{AAC}$ should be the same as the corresponding field in the AACInit; and whether the REQ generates the Security capabilities$_{REQ}$ depends on whether the AACInit sent by the AAC to the REQ carries the Security capabilities$_{AAC}$. The to-be-encrypted data of the EncData$_{REQ}$ includes $ID_{REQ}$ and Cert$_{REQ}$; and the to-be-signed data of the Sig$_{REQ}$ includes other fields before the Sig$_{REQ}$ in the REQInit. When the Nonce$_{AAC}$ field is not included in the REQInit, the to-be-signed data of the Sig$_{REQ}$ further includes the Nonce$_{AAC}$ field in the AACInit.

S605: After receiving the REQInit, the AAC performs the following operations.

(1) If there is Nonce$_{AAC}$ in the REQInit, then check whether the Nonce$_{AAC}$ is the same as the Nonce$_{AAC}$ generated by the AAC; if not, discard the REQInit.

(2) Perform the key exchange calculation according to the temporary private key corresponding to the KeyInfo$_{AAC}$ and the temporary public key included in the KeyInfo$_{REQ}$ to generate a first key K1, combine K1 with the Nonce$_{AAC}$, Nonce$_{REQ}$ and other information (other information used by the AAC and REQ is the same and optional, such as a specific character string, etc.), and calculates a message encryption key and a message integrity check key using the negotiated or preset key derivation algorithm; and the AAC calculates the message integrity check key as an optional operation, and this step can be performed later when needed.

(3) Decrypt the EncData$_{REQ}$ using the message encryption key and the symmetric encryption algorithm to obtain Cert$_{REQ}$ and $ID_{REQ}$.

(4) If the $ID_{AS\_REQ}$ is carried in the REQInit and the $ID_{AS\_AAC}$ is carried in the AACInit, the AAC determines whether there is an identity identifier of at least one same authentication server in the $ID_{AS\_REQ}$ and $ID_{AS\_AAC}$; if so, the case is a non-roaming case, and the AAC determines the first authentication server participating in the identity authentication process from the identity identifier of at least one authentication server trusted by the REQ and AAC; if not, the case is a roaming case, and the AAC needs to determine the first authentication server AS-AAC participating in the identity authentication process according to the $ID_{AS\_AAC}$ and send the $ID_{AS\_REQ}$ to the AS-AAC, so that the AS-AAC determines the second authentication server AS-REQ according to the $ID_{AS\_REQ}$.

Alternatively, if the $ID_{AS\_REQ}$ is carried in the REQInit but the $ID_{AS\_AAC}$ is not carried in the AACInit, the AAC determines whether there is an identity identifier of at least one same authentication server in the $ID_{AS\_REQ}$ and authentication servers trusted by the AAC; if so, the case is a non-roaming case, and the AAC determines the first authentication server participating in the identity authentication process from the identity identifier of at least one authentication server trusted by the REQ and AAC; if not, the case is a roaming case, and the AAC needs to determine the first authentication server AS-AAC participating in the identity authentication process according to the authentication servers trusted by the AAC and send the $ID_{AS\_REQ}$ to the AS-AAC, so that the AS-AAC determines the second authentication server AS-REQ according to the $ID_{AS\_REQ}$.

It should be noted that the result determined in this embodiment should be the roaming case.

S606: The AAC sends a first authentication request message AACVeri to the AS-AAC.

The AACVeri includes $ID_{REQ}$, Nonce$_{REQ}$, Cert$_{REQ}$, $ID_{AS\_REQ}$, $ID_{AAC}$, Nonce$_{AAC}$ and Cert$_{AAC}$, where the $ID_{REQ}$, Nonce$_{REQ}$ and Cert$_{REQ}$ should be the same as the corresponding fields in the REQInit; the Nonce$_{AAC}$ should be the same as the Nonce$_{AAC}$ generated by the AAC; and the $ID_{AS\_REQ}$ is an optional field, and may be the same as the corresponding field in the REQInit.

S607: After receiving the AACVeri, the AS-AAC performs the following operations.

(1) Verify the legality of the Cert$_{AAC}$ to obtain the Res$_{AAC}$, and generate the Pub$_{AAC}$ according to the information including the Res$_{AAC}$ and Cert$_{AAC}$.

(2) If there is $ID_{AS\_REQ}$ in the AACVeri, the AS-AAC determines the second authentication server AS-REQ according to the $ID_{AS\_REQ}$; otherwise, the AS-AAC has determined the AS-REQ.

(3) Calculate a third digital signature $Sig_{AS\_AAC3}$.

S608: The AS-AAC sends a second authentication request message AS-AACVeri to the AS-REQ.

The AS-AACVeri includes $ID_{AAC}$, Nonce$_{AAC}$, Pub$_{AAC}$, $ID_{REQ}$, Nonce$_{REQ}$, Cert$_{REQ}$ and $Sig_{AS\_AAC3}$, where the $ID_{AAC}$, Nonce$_{AAC}$, Cert$_{REQ}$, $ID_{REQ}$ and Nonce$_{REQ}$ should be the same as the corresponding fields in the AACVeri; and the to-be-signed data of the $Sig_{AS\_AAC3}$ includes other fields before the $Sig_{AS\_AAC3}$ in the AS-AACVeri.

S609: After receiving the AS-AACVeri, the AS-REQ performs the following operations.

(1) Verify the $Sig_{AS\_AAC3}$ using the public key of the AS-AAC, and discard the AS-AACVeri if the verification fails.

(2) Verify the legality of the Cert$_{REQ}$ to obtain the Res$_{REQ}$, and generate the Pub$_{REQ}$ according to the information including the Res$_{REQ}$ and Cert$_{REQ}$.

(3) Calculate the first digital signature $Sig_{AS\_REQ1}$ and the fourth digital signature $Sig_{AS\_REQ4}$.

S610: The AS-REQ sends a second authentication response message AS-REQVeri to the AS-AAC.

The AS-REQVeri includes $ID_{REQ}$, Nonce$_{REQ}$, Pub$_{AAC}$, $Sig_{AS\_REQ1}$, $ID_{AAC}$, Nonce$_{AAC}$, Pub$_{REQ}$ and $Sig_{AS\_REQ4}$, where the $ID_{REQ}$, Nonce$_{REQ}$, Pub$_{AAC}$, $ID_{AAC}$ and Nonce$_{AAC}$ should be the same as the corresponding fields in the AS-AACVeri respectively. The to-be-signed data of the $Sig_{AS\_REQ1}$ includes $ID_{REQ}$, Nonce$_{REQ}$ and Pub$_{AAC}$; and the to-be-signed data of the $Sig_{AS\_REQ4}$ includes $ID_{AAC}$, Nonce$_{AAC}$ and Pub$_{REQ}$.

S611: After receiving the AS-REQVeri, the AS-AAC performs the following operations.

(1) Verify the $Sig_{AS\_REQ4}$ using the public key of the AS-REQ, and discard the AS-REQVeri if the verification fails.

(2) Calculate the second digital signature $Sig_{AS\_AAC2}$.

S612: The AS-AAC sends a first authentication response message ASVeri to the AAC.

The ASVeri includes $ID_{REQ}$, $Nonce_{REQ}$, $Pub_{AAC}$, $Sig_{AS\_REQ1}$, $ID_{AAC}$, $Nonce_{AAC}$, $Pub_{REQ}$ and $Sig_{AS\_AAC2}$, where the $ID_{REQ}$, $Nonce_{REQ}$, $Pub_{AAC}$, $Sig_{AS\_REQ1}$, $ID_{AAC}$, $Nonce_{AAC}$ and $Pub_{REQ}$ should be the same as the corresponding fields in the AS-REQVeri respectively; and the to-be-signed data of the $Sig_{AS\_AAC2}$ includes $ID_{AAC}$, $Nonce_{AAC}$ and $Pub_{REQ}$.

S613: After receiving the ASVeri, the AAC performs the following operations.

(1) Check whether the $ID_{AAC}$ and $Nonce_{AAC}$ in the ASVeri are the same as the AAC's own identity identifier $ID_{AAC}$ and the $Nonce_{AAC}$ generated by the AAC respectively.

(2) Verify the $Sig_{AS\_AAC2}$ using the public key of the AS-AAC.

(3) Check whether the $Cert_{REQ}$ in the $Pub_{REQ}$ is the same as the $Cert_{REQ}$ obtained by decrypting the $EncData_{REQ}$.

(4) Verify the $Sig_{REQ}$ using the $Cert_{REQ}$.

(5) If any of the above checks and verifications fails, discard the ASVeri immediately; after the above checks and verifications all pass, determine the identity authentication result of the REQ according to the $Res_{REQ}$ in the $Pub_{REQ}$; if the REQ is determined to be illegal, then end this authentication process.

(6) Calculate $EncData_{AAC}$ using the message encryption key.

(7) Calculate $Sig_{AAC}$.

(8) Calculate $MacTag_{AAC}$ as required, where the calculation process is as described in an embodiment of FIG. 5.

S614: The AAC sends a third authentication response message AACAuth to the REQ.

The AACAuth includes $Nonce_{REQ}$, $Nonce_{AAC}$, $EncData_{AAC}$, $Sig_{AAC}$ and $MacTag_{AAC}$, where the $Nonce_{REQ}$, $Nonce_{AAC}$ and $MacTag_{AAC}$ are optional fields; the $Nonce_{REQ}$ and $Nonce_{AAC}$ should be the same as the $Nonce_{REQ}$ in the REQInit and the $Nonce_{AAC}$ generated by the AAC respectively; the to-be-encrypted data of the $EncData_{AAC}$ includes $ID_{REQ}$, $Nonce_{REQ}$, $Pub_{AAC}$ and $Sig_{AS\_REQ1}$, where the $ID_{REQ}$, $Nonce_{REQ}$, $Pub_{AAC}$ and $Sig_{AS\_REQ1}$ should be the same as the corresponding fields in the ASVeri respectively; and the to-be-signed data of the $Sig_{AAC}$ includes other fields before the $Sig_{AAC}$ in the AACAuth.

S615: After receiving the AACAuth, the REQ performs the following operations.

(1) If there is a $Nonce_{REQ}$ in the AACAuth, check whether the $Nonce_{REQ}$ is the same as the $Nonce_{REQ}$ generated by the REQ; and if there is a $Nonce_{AAC}$ in the AACAuth, check whether the $Nonce_{AAC}$ is the same as the $Nonce_{AAC}$ in the received AACInit.

(2) If there is a $MacTag_{AAC}$ in the AACAuth, verify the $MacTag_{AAC}$, where the verification process is as described in an embodiment of FIG. 5.

(3) Decrypt the $EncData_{AAC}$ using the message encryption key and the symmetric encryption algorithm to obtain the $ID_{REQ}$, $Nonce_{REQ}$, $Pub_{AAC}$ and $Sig_{AS\_REQ1}$.

(4) Check whether the $ID_{REQ}$ and $Nonce_{REQ}$ obtained by decryption are the same as the REQ's own identify $ID_{REQ}$ and the $Nonce_{REQ}$ generated by the REQ respectively.

(5) Verify the $Sig_{AS\_REQ1}$ using the public key of the AS-REQ, and verify the $Sig_{AAC}$ using the $Cert_{AAC}$ in the $Pub_{AAC}$.

(6) After the above checks and verifications all pass, determine the identity authentication result of the AAC according to the $Res_{AAC}$ in the $Pub_{AAC}$; if any of the above checks and verifications fails, discard the AACAuth immediately.

It should be noted that (1) the verification of $Sig_{REQ}$ in S613 may also be changed to be performed in S605, that is, the AAC verifies the $Sig_{REQ}$ using the $Cert_{REQ}$ after decrypting the $EncData_{REQ}$ to obtain the $Cert_{REQ}$. At this time, the $Pub_{REQ}$ may not include the $Cert_{REQ}$. Alternatively, the verification of $Sig_{REQ}$ in S613 may also be changed to be performed by the AS-REQ in S609. In this case, the $Sig_{REQ}$ is transferred to the AS-REQ through the AACVeri of S606 and the AS-AACVeri of S608, and the AS-REQ uses the received $Cert_{REQ}$ to verify the $Sig_{REQ}$. At this time, the $Pub_{REQ}$ may not include the $Cert_{REQ}$. (2) The operation of calculating the $Sig_{AAC}$ in S613 may also be changed to be performed in S606, that is, the AAC performs the signature calculation on the information including $ID_{REQ}$, $Nonce_{REQ}$, $Cert_{REQ}$, $ID_{AS\_REQ}$, $ID_{AAC}$, $Nonce_{AAC}$ and $Cert_{AAC}$ to generate the $Sig_{AAC}$ in S606, where the $ID_{AS\_REQ}$ is an optional field; and then the AACVeri of S606 further includes the $Sig_{AAC}$. In S607, the AS-AAC also needs to verify the $Sig_{AAC}$. After the verification passes, the AS-AAC then performs subsequent operations. In this case, the AAC does not need to calculate the $Sig_{AAC}$ in S613, and correspondingly, the AACAuth of S614 does not include the $Sig_{AAC}$, and the REQ also no longer verifies the $Sig_{AAC}$ in S615. At this time, the $Pub_{AAC}$ may not include the $Cert_{AAC}$.

In the above-mentioned embodiments, each message may also carry a hash value $HASH_{X\_Y}$, the hash value $HASH_{X\_Y}$ is obtained by the sender entity X of this message through calculating the latest preceding message received from the peer entity Y by using a hash algorithm, and is used by the peer entity Y to verify whether the entity X receives the complete latest preceding message. Here, $HASH_{REQ\_AAC}$ represents a hash value calculated by the REQ for the latest preceding message received from the AAC, $HASH_{AAC\_REQ}$ represents a hash value calculated by the AAC for the latest preceding message received from the REQ, $HASH_{AAC\_AS-AAC}$ represents a hash value calculated by the AAC for the latest preceding message received from the AS-AAC, $HASH_{AS-AAC\_AAC}$ represents a hash value calculated by the AS-AAC for the latest preceding message received from the AAC, $HASH_{AS-AAC\_AS-REQ}$ represents a hash value calculated by the AS-AAC for the latest preceding message received from the AS-REQ, and $HASH_{AS-REQ\_AS-AAC}$ represents a hash value calculated by the AS-REQ for the latest preceding message received from the AS-AAC. If the message currently sent by the sender entity X is a first message exchanged between the entity X and entity Y, meaning that the entity X has not received a preceding message sent by the peer entity Y, then the $HASH_{X\_Y}$ in this message may not exist or may be meaningless.

Correspondingly, after the peer entity Y receives a message sent by the entity X, if this message includes $HASH_{X\_Y}$, then: when the entity Y has not sent a preceding message to the entity X, the entity Y ignores $HASH_{X\_Y}$; when the entity Y has sent a preceding message to the entity X, the entity Y uses the hash algorithm to locally calculate a hash value of the latest preceding message previously sent to the entity X, and compares this hash value with the hash value $HASH_{X\_Y}$ carried in the received message. If the hash value of the latest preceding message previously sent to the entity X is consistent with the hash value $HASH_{X\_Y}$ carried in the received message, the subsequent steps are executed, otherwise this authentication process is discarded or ended. In the disclosure, for the entity X, the preceding message sent by the peer entity Y to the entity X refers to: a received message sent by the peer entity Y to the entity X before the entity X sends a message M to the peer entity Y; and the latest preceding message sent by the peer entity Y to the entity X refers to: a received latest message sent by the peer entity Y to the entity X before the entity X sends the message M to the peer entity Y. If the message M sent by the entity X to the peer entity Y is the first message exchanged between the entity X and entity Y, there is no preceding message sent by the peer entity Y to the entity X before the entity X sends the message M to the peer entity Y.

The optional fields and optional operations in embodiments corresponding to FIGS. 5 and 6 are represented by "*" in FIGS. 5 and 6 of the accompanying drawings. The order of the contents included in the messages involved in all the above embodiments is not limited, and unless otherwise specified, there is no limitation on the order of operations on the relevant messages and the processing order of the contents included in the messages after the message receiver receives the messages.

Figure 7:
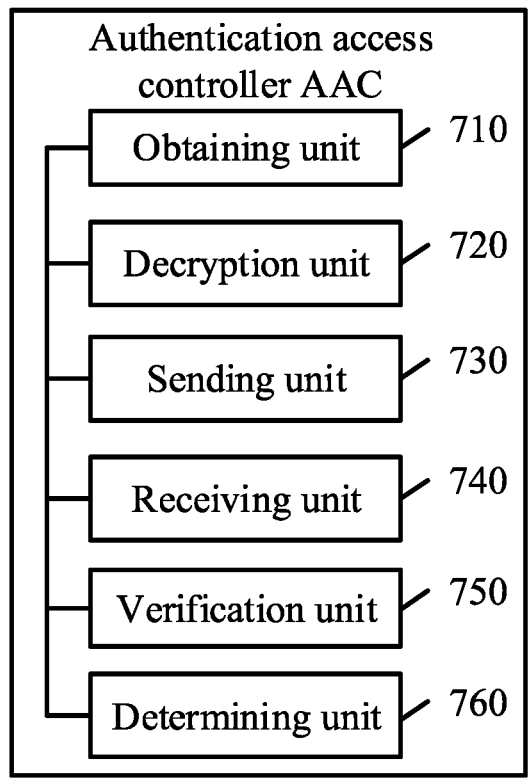
FIG. 7 is a structural block diagram of an authentication access controller AAC according to an embodiment of the present application.

Based on embodiments corresponding to FIGS. 1 to 6, referring to FIG. 7, an embodiment of the present application provides an authentication access controller AAC, including:

- an obtaining unit 710 configured to obtain an identity ciphertext message sent by a request device, where the identity ciphertext message includes an identity information ciphertext of the request device, and the identity information ciphertext is generated by encrypting to-be-encrypted data including a digital certificate of the request device using a message encryption key;
- a decryption unit 720 configured to decrypt the identity information ciphertext of the request device using the message encryption key, to obtain the digital certificate of the request device;
- a sending unit 730 configured to send a first authentication request message to a first authentication server trusted by the authentication access controller, where the first authentication request message includes the digital certificate of the request device and a digital certificate of the authentication access controller;
- a receiving unit 740 configured to receive a first authentication response message sent by the first authentication server, where the first authentication response message includes first authentication result information, a first digital signature, second authentication result information and a second digital signature, the first authentication result information includes a first verification result of the digital certificate of the authentication access controller, the first digital signature is a digital signature generated by a second authentication server trusted by the request device through calculating to-be-signed data including the first authentication result information, the second authentication result information includes a second verification result of the digital certificate of the request device, and the second digital signature is a digital signature generated by the first authentication server through calculating to-be-signed data including the second authentication result information;
- a verification unit 750 configured to verify the second digital signature using a public key of the first authentication server, where a determining unit 760 determines an identity authentication result of the request device according to the second verification result in the second authentication result information when the verification passes; and the sending unit 730 sends a third authentication response message to the request device when the determining unit 760 determines that the identity authentication result of the request device is legal; or
- a verification unit 750 configured to verify the second digital signature using the public key of the first authentication server, where the sending unit 730 sends the third authentication response message to the request device and the determining unit 760 determines the identity authentication result of the request device according to the second verification result in the second authentication result information when the verification passes; or
- a verification unit 750 configured to verify the second digital signature using the public key of the first authentication server; where the determining unit 760 determines the identity authentication result of the request device according to the second verification result in the second authentication result information when the verification of the second digital signature passes; and the sending unit 730 sends the third authentication response message to the request device;
- where the third authentication response message includes an identity authentication result information ciphertext, the identity authentication result information ciphertext is generated by encrypting to-be-encrypted data including the first authentication result information and the first digital signature using the message encryption key.

Optionally, before the obtaining unit 710 obtains the identity ciphertext message, the sending unit 730 is further configured to send a key request message to the request device, where the key request message includes a key exchange parameter of the authentication access controller; the identity ciphertext message obtained by the obtaining unit 710 further includes a key exchange parameter of the request device; and the authentication access controller further includes:

- a calculation unit configured to perform a key exchange calculation according to a temporary private key corresponding to the key exchange parameter of the authentication access controller and a temporary public key included in the key exchange parameter of the request device to generate a first key, and calculate the message encryption key by using a key derivation algorithm according to information including the first key.

Optionally, the key request message sent by the sending unit 730 further includes a first random number generated by the authentication access controller; and the identity ciphertext message obtained by the obtaining unit 710 further includes a second random number generated by the request device;

the calculation unit is further configured to calculate the message encryption key according to information including the first key, the first random number and the second random number.

Optionally, the identity ciphertext message obtained by the obtaining unit 710 further includes the first random number;

before the calculation unit calculates the message encryption key, the verification unit 750 is further configured to verify consistency between the first random number in the identity ciphertext message and the first random number generated by the authentication access controller, and determine that the consistency verification passes.

Optionally, the key request message sent by the sending unit 730 further includes security capability parameter information supported by the authentication access controller, and the identity ciphertext message obtained by the obtaining unit 710 further includes a specific security policy used by the request device and determined by the request device according to the security capability parameter information.

Optionally, the key request message sent by the sending unit 730 further includes an identity identifier of at least one authentication server trusted by the authentication access controller; and the identity ciphertext message obtained by the obtaining unit 710 further includes an identity identifier of at least one authentication server trusted by the request device;

the determining unit 760 is further configured to determine the first authentication server according to the identity identifier of at least one authentication server trusted by the request device in the identity ciphertext message and the identity identifier of at least one authentication server trusted by the authentication access controller in the key request message.

Optionally, the identity ciphertext message obtained by the obtaining unit 710 further includes an identity identifier of at least one authentication server trusted by the request device;

the determining unit 760 is further configured to determine the first authentication server according to the identity identifier of at least one authentication server trusted by the request device in the identity ciphertext message and an identity identifier of an authentication server trusted by the authentication access controller.

Optionally, the first authentication request message sent by the sending unit 730 further includes an identity identifier of the authentication access controller and/or a first random number generated by the authentication access controller; and correspondingly, the first authentication response message received by the receiving unit 740 further includes the identity identifier of the authentication access controller and/or the first random number;

before the determining unit 760 determines the identity authentication result of the request device, the verification unit 750 is further configured to verify consistency between the identity identifier of the authentication access controller in the first authentication response message and the identity identifier of the authentication access controller itself, and/or, verify consistency between the first random number in the first authentication response message and the first random number generated by the authentication access controller, and determine that the consistency verification passes.

Optionally, the identity ciphertext message obtained by the obtaining unit 710 further includes a second random number generated by the request device, and/or, the to-be-encrypted data of the identity information ciphertext in the identity ciphertext message further includes an identity identifier of the request device; and correspondingly, the first authentication request message sent by the sending unit 730 further includes the second random number and/or the identity identifier of the request device;

the first authentication response message received by the receiving unit 740 further includes the second random number and/or the identity identifier of the request device;

the to-be-encrypted data of the identity authentication result information ciphertext in the third authentication response message sent by the sending unit 730 further includes the second random number and/or the identity identifier of the request device.

Optionally, the identity ciphertext message obtained by the obtaining unit 710 further includes a digital signature of the request device, and before the determining unit 760 determines the identity authentication result of the request device, the determining unit 760 is further configured to determine that a verification of the digital signature of the request device passes.

Optionally, the determining unit 760 is configured to:

verify the digital signature of the request device using the digital certificate of the request device obtained by the decryption unit 720 through decrypting the identity information ciphertext of the request device, and determine whether the verification of the digital signature of the request device passes according to a verification result; or verify the digital signature of the request device using the digital certificate of the request device in the second authentication result information when the second authentication result information further includes the digital certificate of the request device, and determine whether the verification of the digital signature of the request device passes according to a verification result; or verify consistency between the digital certificate of the request device in the second authentication result information and the digital certificate of the request device obtained by decrypting the identity information ciphertext in the identity ciphertext message when the second authentication result information further includes the digital certificate of the request device; and verify the digital signature of the request device using the digital certificate of the request device in case of consistency, and determine whether the verification of the digital signature of the request device passes according to a verification result; or verify the digital signature of the request device using the received digital certificate of the request device by the second authentication server, and determine that the verification of the digital signature of the request device passes when the receiving unit 740 receives the first authentication response message.

Optionally, the third authentication response message sent by the sending unit 730 further includes a message integrity check code, the message integrity check code is generated by the calculation unit through calculating fields other than the message integrity check code in the third authentication response message using a message integrity check key; and the message integrity check key is generated in a same way as the message encryption key.

Optionally, the message sent by the authentication access controller to the request device further includes a hash value calculated by the authentication access controller for a received latest preceding message sent by the request device; and the message sent by the authentication access controller to the first authentication server further includes a hash value calculated by the authentication access controller for a received latest preceding message sent by the first authentication server.

Figure 8:
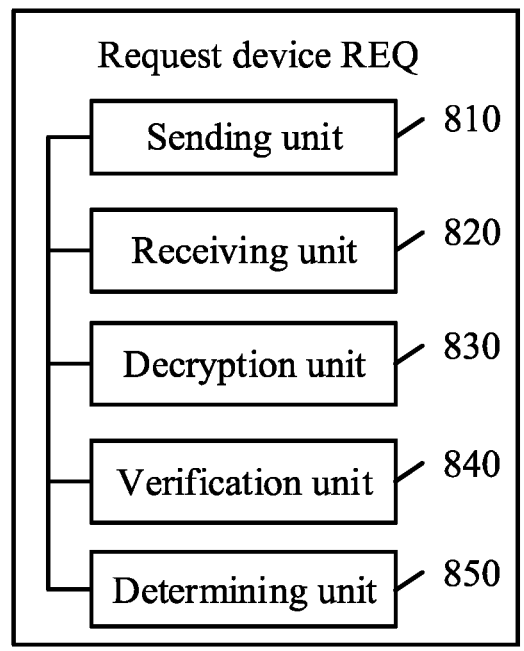
FIG. 8 is a structural block diagram of a request device REQ according to an embodiment of the present application.

Referring to FIG. 8, an embodiment of the present application further provides a request device REQ, including:

a sending unit 810 configured to send an identity ciphertext message to an authentication access controller, where the identity ciphertext message includes an identity information ciphertext of the request device, and the identity information ciphertext is generated by encrypting to-be-encrypted data including a digital certificate of the request device using a message encryption key;

a receiving unit 820 configured to receive a third authentication response message sent by the authentication access controller, where the third authentication response message includes an identity authentication result information ciphertext, the identity authentication result information ciphertext is generated by encrypting to-be-encrypted data including first authentication result information and a first digital signature using the message encryption key; the first authentication result information includes a first verification result of a digital certificate of the authentication access controller, and the first digital signature is a digital signature generated by a second authentication server trusted by the request device through calculating to-be-signed data including the first authentication result information;

a decryption unit 830 configured to decrypt the identity authentication result information ciphertext using the message encryption key, to obtain the first authentication result information and the first digital signature;

a verification unit 840 configured to verify the first digital signature using a public key of the second authentication server;

a determining unit 850 configured to determine an identity authentication result of the authentication access controller according to the first verification result in the first authentication result information when the verification of the first digital signature passes.

Optionally, before the sending unit 810 sends the identity ciphertext message, the receiving unit 820 is further configured to receive a key request message sent by the authentication access controller, where the key request message includes a key exchange parameter of the authentication access controller; and the request device further includes:

a calculation unit configured to perform a key exchange calculation according to a temporary private key corresponding to a key exchange parameter of the request device and a temporary public key included in the key exchange parameter of the authentication access controller to generate a first key, and calculate the message encryption key by using a key derivation algorithm according to information including the first key;

where the identity ciphertext message sent by the sending unit 810 further includes the key exchange parameter of the request device.

Optionally, the key request message received by the receiving unit 820 further includes a first random number generated by the authentication access controller;

the calculation unit is further configured to calculate the message encryption key according to information including the first key, the first random number, and a second random number generated by the request device;

the identity ciphertext message sent by the sending unit 810 further includes the second random number.

Optionally, the key request message received by the receiving unit 820 further includes security capability parameter information supported by the authentication access controller, and the determining unit 850 is further configured to determine a specific security policy used by the request device according to the security capability parameter information;

the identity ciphertext message sent by the sending unit 810 further includes the specific security policy.

Optionally, the key request message received by the receiving unit 820 further includes an identity identifier of at least one authentication server trusted by the authentication access controller; and the determining unit 850 is further configured to determine an identity identifier of at least one authentication server trusted by the request device according to the identity identifier of at least one authentication server trusted by the authentication access controller;

the identity ciphertext message sent by the sending unit 810 further includes the identity identifier of at least one authentication server trusted by the request device.

Optionally, the identity ciphertext message sent by the sending unit 810 further includes an identity identifier of at least one authentication server trusted by the request device.

Optionally, the identity ciphertext message sent by the sending unit 810 further includes a second random number generated by the request device, and/or, the to-be-encrypted data of the identity information ciphertext in the identity ciphertext message further includes an identity identifier of the request device;

correspondingly, the to-be-encrypted data of the identity authentication result information ciphertext in the third authentication response message received by the receiving unit 820 further includes the second random number and/or the identity identifier of the request device;

the decryption unit 830 decrypts the identity authentication result information ciphertext to further obtain the second random number and/or the identity identifier of the request device;

before the determining unit 850 determines the identity authentication result of the authentication access controller, the verification unit 840 is further configured to verify consistency between the second random number obtained by the decryption unit 830 through decryption and the second random number generated by the request device, and/or, verify consistency between the identity identifier of the request device obtained by the decryption unit 830 through decryption and the identity identifier of the request device itself; and the request device determines that the consistency verification passes.

Optionally, before the determining unit 850 determines the identity authentication result of the authentication access controller, the determining unit 850 is further configured to determine that a verification of a digital signature of the authentication access controller passes.

Optionally, the determining unit 850 is configured to:

when a first authentication request message sent by the authentication access controller to a first authentication server trusted by the authentication access controller further includes the digital signature of the authentication access controller, and the first authentication server verifies the digital signature of the authentication access controller using the digital certificate of the authentication access controller in the first authentication request message, determine that the verification of the digital signature of the authentication access controller passes when the receiving unit 820 receives the third authentication response message; or when the third authentication response message further includes the digital signature of the authentication access controller, and the first authentication result information further includes the digital certificate of the authentication access controller correspondingly, verify the digital signature of the authentication access controller using the digital certificate of the authentication access controller, and determine whether the verification of the digital signature of the authentication access controller passes according to a verification result.

Optionally, the third authentication response message received by the receiving unit 820 further includes a message integrity check code; and before the determining unit 850 determines the identity authentication result of the authentication access controller, the verification unit 840 is further configured to verify the message integrity check code using a message integrity check key; where the message integrity check key is generated in a same way as the message encryption key.

Optionally, the message sent by the request device to the authentication access controller further includes a hash value calculated by the request device for a received latest preceding message sent by the authentication access controller.

Figure 9:
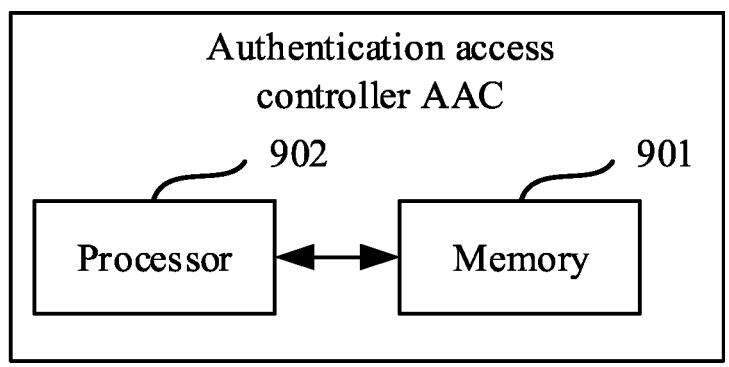
FIG. 9 is a structural block diagram of another authentication access controller AAC according to an embodiment of the present application.

Referring to FIG. 9, an embodiment of the present application further provides an authentication access controller AAC, including:
- a memory 901 configured to store program instructions;
- a processor 902 configured to invoke the program instructions stored in the memory 901, and perform the steps executed by the AAC in the above-mentioned embodiments in accordance with an obtained program.

It should be understood that the authentication access controller can implement the corresponding processes implemented by the AAC in the various methods of embodiments of the present application, and the details are not repeated here for the sake of brevity.

Figure 10:
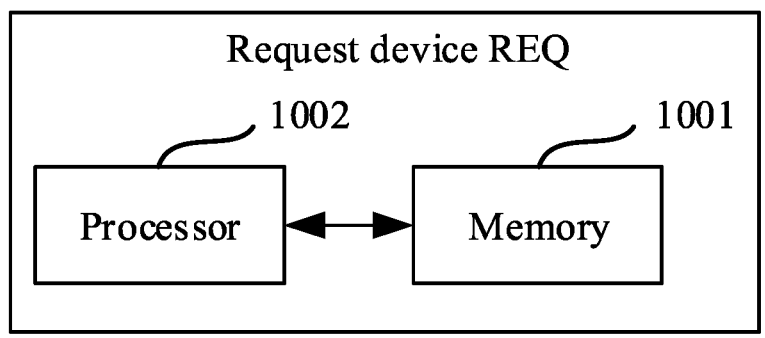
FIG. 10 is a structural block diagram of another request device REQ according to an embodiment of the present application.

Referring to FIG. 10, an embodiment of the present application further provides a request device REQ, including:
- a memory 1001 configured to store program instructions;
- a processor 1002 configured to invoke the program instructions stored in the memory 1001, and perform the steps executed by the REQ in the above-mentioned embodiments in accordance with an obtained program.

It should be understood that the request device can implement the corresponding processes implemented by the REQ in the various methods of embodiments of the present application, and the details are not repeated here for the sake of brevity.

It can be understood by those skilled in the art that all or some of the steps for realizing the above-mentioned method embodiments can be completed by the hardware related to program instructions. The aforementioned program can be stored in a computer-readable storage medium. The program performs the steps of the above-mentioned method embodiments when executed; and the aforementioned storage medium may be at least one of: Read-Only Memory (ROM), RAM, magnetic disk, optical disk, or other various media that can store program codes.

It should be noted that various embodiments in this specification are described in a progressive manner, the same or similar parts among the various embodiments can refer to each other, and each embodiment focuses on the differences from other embodiments. In particular, the device and system embodiments are consistent with and correspond to the method embodiments, so the description is relatively simple, and the related parts may refer to the partial illustration of the method embodiments. The device and system embodiments described above are merely illustrative, where the units described as separate components may or may not be physically separated, and the components displayed as units may or may not be physical units, that is, may be located in one place or may be distributed onto multiple network units. Some or all of the modules may be selected according to the actual needs to achieve the objects of the solutions of the embodiments. Those ordinary skilled in the art can understand and implement without creative labor.

The above description is only the specific embodiments of the present application, but the protection scope of the present application is not limited to this. The changes or replacements that any person skilled in the art can easily think of within the technical scope disclosed in the present application should be encompassed within the protection scope of the present application. Therefore, the protection scope of the present application should be subject to the protection scope of the claims.

What is claimed is:

1. An identity authentication method, comprising:
obtaining, by an authentication access controller, an identity ciphertext message sent by a request device, wherein the identity ciphertext message comprises an identity information ciphertext of the request device, and the identity information ciphertext is generated by encrypting to-be-encrypted data comprising a digital certificate of the request device using a message encryption key;
decrypting, by the authentication access controller, the identity information ciphertext of the request device using the message encryption key, to obtain the digital certificate of the request device;
sending, by the authentication access controller, a first authentication request message to a first authentication server trusted by the authentication access controller, wherein the first authentication request message comprises the digital certificate of the request device and a digital certificate of the authentication access controller;
receiving, by the authentication access controller, a first authentication response message sent by the first authentication server, wherein the first authentication response message comprises first authentication result information, a first digital signature, second authentication result information and a second digital signature, the first authentication result information comprises a first verification result of the digital certificate of the authentication access controller, the first digital signature is a digital signature generated by a second authentication server trusted by the request device through calculating to-be-signed data comprising the first authentication result information, the second authentication result information comprises a second verification result of the digital certificate of the request device, and the second digital signature is a digital signature generated by the first authentication server through calculating to-be-signed data comprising the second authentication result information;
verifying, by the authentication access controller, the second digital signature using a public key of the first authentication server; determining, by the authentication access controller, an identity authentication result of the request device according to the second verification result in the second authentication result information when the verification passes; and sending, by the authentication access controller, a third authentication response message to the request device when determining that the identity authentication result of the request device is legal; or
verifying, by the authentication access controller, the second digital signature using the public key of the first authentication server; and sending, by the authentication access controller, the third authentication response message to the request device and determining the identity authentication result of the request device according to the second verification result in the second authentication result information when the verification passes; or verifying, by the authentication access controller, the second digital signature using the public key of the first authentication server; determining, by the authentication access controller, the identity authentication result of the request device according to the second verification result in the second authentication result information when the verification of the second digital signature passes; and sending, by the authentication access controller, the third authentication response message to the request device;

wherein the third authentication response message comprises an identity authentication result information ciphertext, the identity authentication result information ciphertext is generated by encrypting to-be-encrypted data comprising the first authentication result information and the first digital signature using the message encryption key;

decrypting, by the request device, the identity authentication result information ciphertext using the message encryption key to obtain the first authentication result information and the first digital signature after receiving the third authentication response message; verifying, by the request device, the first digital signature using a public key of the second authentication server; and determining, by the request device, an identity authentication result of the authentication access controller according to the first verification result in the first authentication result information when the verification passes.

2. The method according to claim 1, wherein before the authentication access controller obtains the identity ciphertext message sent by the request device, the method further comprises:

sending, by the authentication access controller, a key request message to the request device, wherein the key request message comprises a key exchange parameter of the authentication access controller;

performing, by the request device, a key exchange calculation according to a temporary private key corresponding to a key exchange parameter of the request device and a temporary public key comprised in the key exchange parameter of the authentication access controller to generate a first key, and calculating the message encryption key by using a key derivation algorithm according to information comprising the first key; wherein the identity ciphertext message sent by the request device to the authentication access controller further comprises the key exchange parameter of the request device;

performing, by the authentication access controller, a key exchange calculation according to a temporary private key corresponding to the key exchange parameter of the authentication access controller and a temporary public key comprised in the key exchange parameter of the request device to generate the first key, and calculating the message encryption key by using the key derivation algorithm according to the information comprising the first key.

3. The method according to claim 2, wherein the key request message further comprises a first random number generated by the authentication access controller;

the calculating, by the request device, the message encryption key, comprises:

calculating, by the request device, the message encryption key according to information comprising the first key, the first random number, and a second random number generated by the request device;

correspondingly, the identity ciphertext message further comprises the second random number;

the calculating, by the authentication access controller, the message encryption key, comprises:

calculating, by the authentication access controller, the message encryption key according to the information comprising the first key, the first random number and the second random number.

4. The method according to claim 3, wherein the identity ciphertext message further comprises the first random number; and before the authentication access controller calculates the message encryption key, the method further comprises:

verifying, by the authentication access controller, consistency between the first random number in the identity ciphertext message and the first random number generated by the authentication access controller, and determining that the consistency verification passes.

5. The method according to claim 2, wherein the key request message further comprises security capability parameter information supported by the authentication access controller, and the method further comprises:

determining, by the request device, a specific security policy used by the request device according to the security capability parameter information;

and the identity ciphertext message further comprises the specific security policy.

6. The method according to claim 2, wherein the key request message further comprises an identity identifier of at least one authentication server trusted by the authentication access controller; and the method further comprises:

determining, by the request device, an identity identifier of at least one authentication server trusted by the request device according to the identity identifier of at least one authentication server trusted by the authentication access controller;

the identity ciphertext message further comprises the identity identifier of at least one authentication server trusted by the request device;

and determining, by the authentication access controller, the first authentication server according to the identity identifier of at least one authentication server trusted by the request device in the identity ciphertext message and the identify identifier of at least one authentication server trusted by the authentication access controller in the key request message.

7. The method according to claim 1, wherein the identity ciphertext message further comprises an identity identifier of at least one authentication server trusted by the request device; and the method further comprises:

determining, by the authentication access controller, the first authentication server according to the identity identifier of at least one authentication server trusted by the request device in the identity ciphertext message and an identity identifier of an authentication server trusted by the authentication access controller.

8. The method according to claim 1, wherein the first authentication request message further comprises an identity identifier of the authentication access controller and/or a first random number generated by the authentication access controller;

correspondingly, the first authentication response message further comprises the identity identifier of the authentication access controller and/or the first random number;

before the authentication access controller determines the identity authentication result of the request device, the method further comprises:

verifying, by the authentication access controller, consistency between the identity identifier of the authentication access controller in the first authentication response message and the identity identifier of the authentication access controller itself; and/or, verifying consistency between the first random number in the first authentication response message and the first random number generated by the authentication access controller, and determining that the consistency verification passes.

9. The method according to claim 1, wherein the identity ciphertext message further comprises a second random number generated by the request device, and/or, the to-be-encrypted data of the identity information ciphertext in the identity ciphertext message further comprises an identity identifier of the request device;

correspondingly, the first authentication request message further comprises the second random number and/or the identity identifier of the request device;

the first authentication response message further comprises the second random number and/or the identity identifier of the request device;

the to-be-encrypted data of the identity authentication result information ciphertext in the third authentication response message further comprises the second random number and/or the identity identifier of the request device;

before the request device determines the identity authentication result of the authentication access controller, the method further comprises:

decrypting, by the request device, the identity authentication result information ciphertext using the message encryption key, to further obtain the second random number and/or the identity identifier of the request device;

verifying, by the request device, consistency between the second random number obtained by decryption and the second random number generated by the request device, and/or, verifying consistency between the identity identifier of the request device obtained by decryption and the identity identifier of the request device itself; and determining, by the request device, that the consistency verification passes.

10. The method according to claim 1, wherein the identity ciphertext message further comprises a digital signature of the request device, and before the authentication access controller determines the identity authentication result of the request device, the method further comprises:

determining, by the authentication access controller, that a verification of the digital signature of the request device passes.

11. The method according to claim 10, wherein the authentication access controller determines whether the verification of the digital signature of the request device passes by:

verifying, by the authentication access controller, the digital signature of the request device using the digital certificate of the request device obtained by decrypting the identity information ciphertext of the request device, and determining whether the verification of the digital signature of the request device passes according to a verification result; or verifying, by the authentication access controller, the digital signature of the request device using the digital certificate of the request device in the second authentication result information when the second authentication result information further comprises the digital certificate of the request device, and determining whether the verification of the digital signature of the request device passes according to a verification result; or verifying, by the authentication access controller, consistency between the digital certificate of the request device in the second authentication result information and the digital certificate of the request device obtained by decrypting the identity information ciphertext in the identity ciphertext message when the second authentication result information further comprises the digital certificate of the request device; and then verifying, by the authentication access controller, the digital signature of the request device using the digital certificate of the request device in case of consistency, and determining whether the verification of the digital signature of the request device passes according to a verification result; or verifying, by the second authentication server, the digital signature of the request device using the received digital certificate of the request device, and determining, by the authentication access controller, that the verification of the digital signature of the request device passes when receiving the first authentication response message.

12. The method according to claim 1, wherein before the request device determines the identity authentication result of the authentication access controller, the method further comprises:

determining, by the request device, that a verification of a digital signature of the authentication access controller passes.

13. The method according to claim 12, wherein the request device determines whether the verification of the digital signature of the authentication access controller passes by:

verifying, by the first authentication server, the digital signature of the authentication access controller using the digital certificate of the authentication access controller in the first authentication request message when the first authentication request message further comprises the digital signature of the authentication access controller, and determining, by the request device, that the verification of the digital signature of the request device passes when receiving the third authentication response message; or when the third authentication response message further comprises the digital signature of the authentication access controller, the first authentication result information further comprises the digital certificate of the authentication access controller correspondingly; and verifying, by the request device, the digital signature of the authentication access controller using the digital certificate of the authentication access controller, and determining whether the verification of the digital signature of the authentication access controller passes according to a verification result.

14. The method according to claim 2, wherein the third authentication response message further comprises a message integrity check code, the message integrity check code is generated by the authentication access controller through calculating fields other than the message integrity check code in the third authentication response message using a message integrity check key; and the message integrity check key of the authentication access controller is generated in a same way as the message encryption key of the authentication access controller;
  before the request device determines the identity authentication result of the authentication access controller, the method further comprises:
  verifying, by the request device, the message integrity check code using the message integrity check key; wherein the message integrity check key of the request device is generated in a same way as the message encryption key of the request device.

15. The method according to claim 1, wherein the first authentication server trusted by the authentication access controller and the second authentication server trusted by the request device are a same authentication server, and the method further comprises:
  performing, by the first authentication server, a legality verification on the digital certificate of the authentication access controller to obtain a first verification result and a legality verification on the digital certificate of the request device to obtain a second verification result, generating the first authentication result information according to information comprising the first verification result, generating the second authentication result information according to information comprising the second verification result, calculating the to-be-signed data comprising the first authentication result information to generate the first digital signature, calculating the to-be-signed data comprising the second authentication result information to generate the second digital signature, and generating the first authentication response message according to information comprising the first authentication result information, the first digital signature, the second authentication result information and the second digital signature.

16. The method according to claim 1, wherein the first authentication server trusted by the authentication access controller and the second authentication server trusted by the request device are two different authentication servers; and the method further comprises:
  performing, by the first authentication server, a legality verification on the digital certificate of the authentication access controller to obtain a first verification result, generating the first authentication result information according to information comprising the first verification result, and calculating to-be-signed data comprising the first authentication result information and the digital certificate of the request device to generate a third digital signature;
  sending, by the first authentication server, a second authentication request message to the second authentication server, wherein the second authentication request message comprises the first authentication result information, the digital certificate of the request device and the third digital signature; verifying, by the second authentication server, the third digital signature using the public key of the first authentication server; performing, by the second authentication server, a legality verification on the digital certificate of the request device to obtain the second verification result when the verification passes, generating the second authentication result information according to information comprising the second verification result, calculating the to-be-signed data comprising the first authentication result information to generate the first digital signature, and calculating the to-be-signed data comprising the second authentication result information to generate a fourth digital signature;
  receiving, by the first authentication server, a second authentication response message sent by the second authentication server, wherein the second authentication response message comprises the first authentication result information, the first digital signature, the second authentication result information and the fourth digital signature;
  verifying, by the first authentication server, the fourth digital signature using the public key of the second authentication server; calculating, by the first authentication server, the to-be-signed data comprising the second authentication result information to generate the second digital signature when the verification passes; and generating the first authentication response message according to information comprising the first authentication result information, the first digital signature, the second authentication result information and the second digital signature.

17. The method according to claim 1, further comprising:
  the identity ciphertext message sent by the request device to the authentication access controller further comprises a hash value calculated by the request device for a received latest preceding message sent by the authentication access controller; and verifying, by the authentication access controller, the hash value in the identity ciphertext message when receiving the identity ciphertext message sent by the request device and determining that the verification passes;
  the third authentication response message sent by the authentication access controller to the request device further comprises a hash value calculated by the authentication access controller for a received latest preceding message sent by the request device; and verifying, by the request device, the hash value in the third authentication response message when receiving the third authentication response message sent by the authentication access controller and determining that the verification passes;
  the first authentication request message sent by the authentication access controller to the first authentication server further comprises a hash value calculated by the authentication access controller for a received latest preceding message sent by the first authentication server; and verifying, by the first authentication server, the hash value in the first authentication request message when receiving the first authentication request message sent by the authentication access controller and determining that the verification passes;
  the first authentication response message sent by the first authentication server to the authentication access controller further comprises a hash value calculated by the first authentication server for a received latest preceding message sent by the authentication access controller; and verifying, by the authentication access controller, the hash value in the first authentication response message when receiving the first authentication response message sent by the first authentication server and determining that the verification passes.

18. An authentication access controller, comprising:
a memory configured to store program instructions;
a processor configured to invoke the program instructions stored in the memory and perform:
obtaining an identity ciphertext message sent by a request device, wherein the identity ciphertext message comprises an identity information ciphertext of the request device, and the identity information ciphertext is generated by encrypting to-be-encrypted data comprising a digital certificate of the request device using a message encryption key;
decrypting the identity information ciphertext of the request device using the message encryption key, to obtain the digital certificate of the request device;
sending a first authentication request message to a first authentication server trusted by the authentication access controller, wherein the first authentication request message comprises the digital certificate of the request device and a digital certificate of the authentication access controller;
receiving a first authentication response message sent by the first authentication server, wherein the first authentication response message comprises first authentication result information, a first digital signature, second authentication result information and a second digital signature, the first authentication result information comprises a first verification result of the digital certificate of the authentication access controller, the first digital signature is a digital signature generated by a second authentication server trusted by the request device through calculating to-be-signed data comprising the first authentication result information, the second authentication result information comprises a second verification result of the digital certificate of the request device, and the second digital signature is a digital signature generated by the first authentication server through calculating to-be-signed data comprising the second authentication result information;
verifying the second digital signature using a public key of the first authentication server, determining an identity authentication result of the request device according to the second verification result in the second authentication result information when the verification passes; and sending a third authentication response message to the request device when determining that the identity authentication result of the request device is legal; or
verifying the second digital signature using the public key of the first authentication server, sending the third authentication response message to the request device and determining the identity authentication result of the request device according to the second verification result in the second authentication result information when the verification passes; or
verifying the second digital signature using the public key of the first authentication server; determining the identity authentication result of the request device according to the second verification result in the second authentication result information when the verification of the second digital signature passes; and sending the third authentication response message to the request device;
wherein the third authentication response message comprises an identity authentication result information ciphertext, the identity authentication result information ciphertext is generated by encrypting to-be-encrypted data comprising the first authentication result information and the first digital signature using the message encryption key.

19. A request device, comprising:
a memory configured to store program instructions;
a processor configured to invoke the program instructions stored in the memory and perform:
sending an identity ciphertext message to an authentication access controller, wherein the identity ciphertext message comprises an identity information ciphertext of the request device, and the identity information ciphertext is generated by encrypting to-be-encrypted data comprising a digital certificate of the request device using a message encryption key;
receiving a third authentication response message sent by the authentication access controller, wherein the third authentication response message comprises an identity authentication result information ciphertext, the identity authentication result information ciphertext is generated by encrypting to-be-encrypted data comprising first authentication result information and a first digital signature using the message encryption key; the first authentication result information comprises a first verification result of a digital certificate of the authentication access controller, and the first digital signature is a digital signature generated by a second authentication server trusted by the request device through calculating to-be-signed data comprising the first authentication result information;
decrypting the identity authentication result information ciphertext using the message encryption key, to obtain the first authentication result information and the first digital signature;
verifying the first digital signature using a public key of the second authentication server;
determining an identity authentication result of the authentication access controller according to the first verification result in the first authentication result information when the verification of the first digital signature passes.

20. The request device according to claim 19, wherein before sending the identity ciphertext message, the processor is further configured to perform:
receiving a key request message sent by the authentication access controller, wherein the key request message comprises a key exchange parameter of the authentication access controller; and
performing a key exchange calculation according to a temporary private key corresponding to a key exchange parameter of the request device and a temporary public key comprised in the key exchange parameter of the authentication access controller to generate a first key, and calculate the message encryption key by using a key derivation algorithm according to information comprising the first key; wherein the identity ciphertext message further comprises the key exchange parameter of the request device.

* * * * *